United States Patent [19]
Kuribayashi

[11] Patent Number: 5,870,372
[45] Date of Patent: Feb. 9, 1999

[54] ADAPTIVE EQUALIZER OF RECORDED INFORMATION REPRODUCING APPARATUS

[75] Inventor: Hiroki Kuribayashi, Tsurugashima, Japan

[73] Assignee: Pioneer Electronic Corporation, Tokyo, Japan

[21] Appl. No.: 877,951

[22] Filed: Jun. 17, 1997

[30] Foreign Application Priority Data

Sep. 13, 1996 [JP] Japan ................................ 8-243704

[51] Int. Cl.$^6$ .......................................................... G11B 7/00
[52] U.S. Cl. .............................................. 369/124; 369/54
[58] Field of Search .............................. 369/44.32, 124, 369/54, 44.35, 44.36, 44.34

[56] References Cited

U.S. PATENT DOCUMENTS

| | | | |
|---|---|---|---|
| 5,442,615 | 8/1995 | Ohsato et al. | 369/44.32 |
| 5,546,367 | 8/1996 | Yoshimura et al. | 369/124 |
| 5,703,855 | 12/1997 | Kirino et al. | 369/54 |
| 5,719,847 | 2/1998 | Tateishi et al. | 369/124 |

*Primary Examiner*—Thang V. Tran
*Attorney, Agent, or Firm*—Sughrue, Mion, Zinn, Macpeak & Seas, PLLC

[57] ABSTRACT

To provide an adaptive equalizer of a recorded information reproducing apparatus capable of securing a desired waveform equalizing accuracy with a small circuit scale. The adaptive equalizer includes first delay means for delaying a read sample read and sampled from an optical recording medium by the first delay time shown below and successively outputting the resulting value, second delay means for further delaying the value output from the first delay means by the second delay time shown below and successively outputting the resulting value, third delay means for further delaying the value output from the second delay means by the second delay time and successively outputting the resulting value, fourth delay means for delaying the value output from the third delay means by the first delay time and successively outputting the resulting value, and an equalizer executes adaptive operations based on the read sample output from the first delay means and fourth delay means, input read sample, and a read sample output from the third delay means.

$\{0.6*(\lambda/NA)/V_L\} <$ first delay time+second delay time $< \{1.0*(\lambda/NA)/V_L\}$ $\{0.3*(\lambda/NA)/V_L\} <$ second delay time $< \{0.6*(\lambda/NA)/V_L\}$.

$\lambda$: a read beam wavelength
$V_L$: a read linear velocity
NA: a numerical aperture of a objective lens

6 Claims, 14 Drawing Sheets

READ DIRECTION

READ DIRECTION

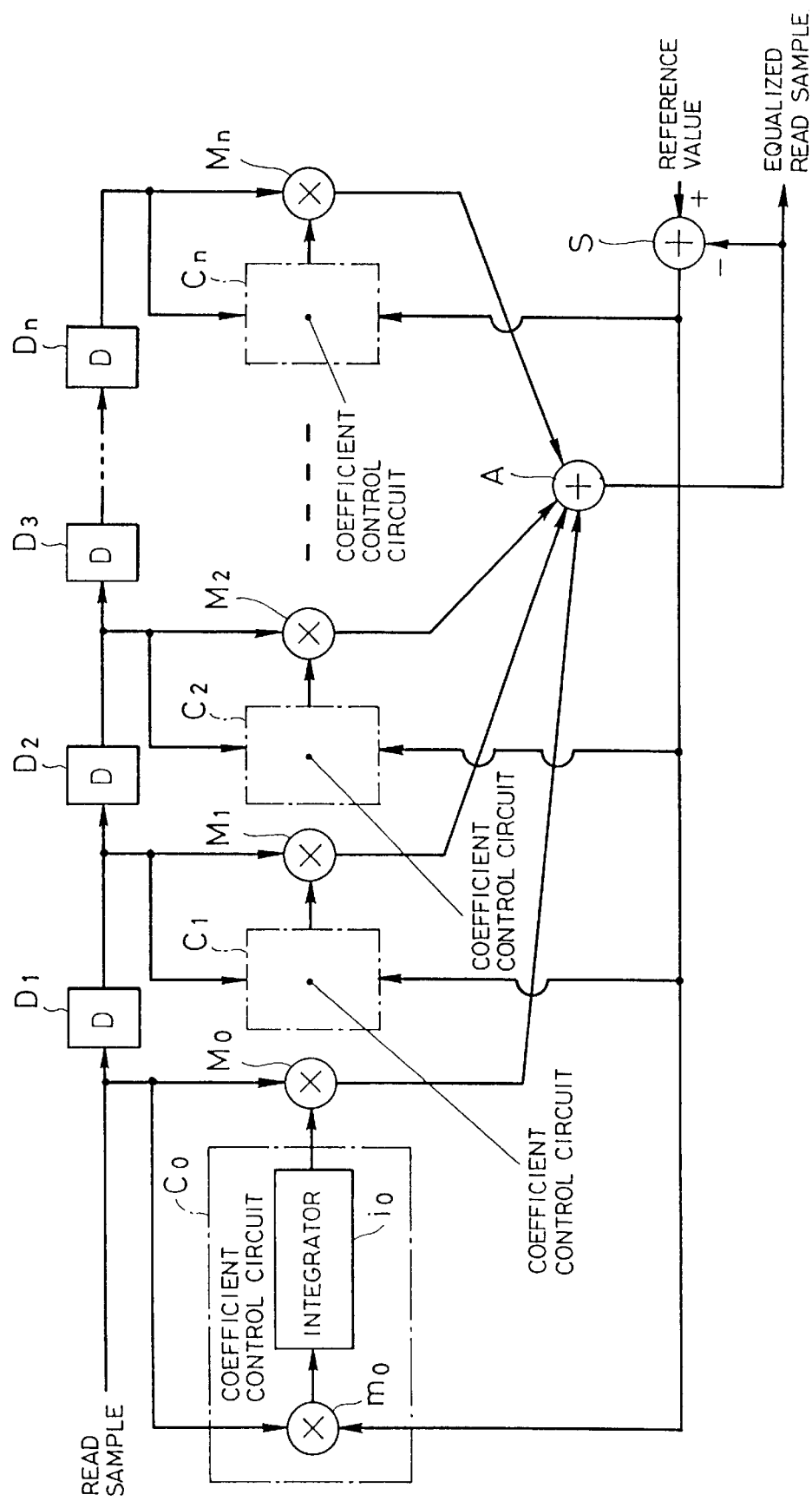

ADAPTIVE EQUALIZER OF RECORDED INFORMATION REPRODUCING APPARATUS

BACKGROUND OF THE INVENTION

1. Field of the Invention

The present invention relates to an adaptive equalizer of a recorded information reproducing apparatus for reproducing the recorded information from a recording medium.

2. Description of the Related Art

To correctly read recorded data from a optical disk in which digital data is recorded as a bit sequence, it is necessary to correctly apply an information-reading optical beam applied on the disk onto bits.

However, if an optical disk 1 is distorted, it may be set with a tilt in the read direction of a pickup 3 (hereafter referred to as tangential skew) as shown in FIG. 1A or 1B.

Therefore, an information read beam emitted from the pickup 3 is tilted with respect to the disk surface. In this case, a wave front aberration mainly consisting of a coma aberration increases and the waveform of a read signal is distorted.

Therefore, a recorded information reproducing apparatus for reproducing the recorded information from the optical disk is provided with an adaptive equalizer using an FIR (finite impulse response) filter in order to electrically equalize the distorted waveform of the read signal to an ideal waveform.

FIG. 2 is an illustration showing the structure of the adaptive equalizer.

In FIG. 2, a read sample obtained by sampling a read signal read from an unillustrated optical disk is supplied to a system comprising n cascade-connected unit delay elements $D_1$ to $D_n$. The unit delay elements $D_1$ to $D_n$ provide a time delay equal to the sampling cycle of the read sample and the output of one unit delay element serves as an input one sampling period before. The read sample and the output of each unit delay element are supplied to an adaptive arithmetic circuit comprising coefficient multipliers $M_0$ to $M_n$, coefficient control circuits $C_0$ to $C_n$, and an adder A. Each of the coefficient control circuits $C_0$ to $C_n$ comprises a multiplier and an integrator. For example, a multiplier $m_0$ of the coefficient control circuit $C_0$ supplies a value obtained by multiplying the value of a supplied read sample by an error value obtained by a subtracter S to an integrator $i_0$. The integrator io supplies a value obtained by averaging the multiplied value to the coefficient multiplier $M_0$ as a multiplication coefficient. According to the above structure, the respective coefficient control circuits $C_0$ to $C_n$ update the multiplication coefficients to be supplied to the coefficient multipliers $M_0$ to $M_n$ so that the error value obtained by the subtracter S may be 0.

The coefficient multiplier $M_0$ supplies a multiplication result obtained by multiplying the read sample by a multiplication coefficient supplied from the coefficient control circuit $C_0$ to the adder A. The coefficient multipliers $M_1$ to $M_n$ multiply values output from the unit delay elements $D_1$ to $D_n$ by values supplied from the coefficient control circuits $C_1$ to $C_n$ and supply multiplication results to the adder A, respectively. The adder A computes the sum total of the multiplication results of the coefficient multipliers $M_0$ to $M_n$ and outputs the sum total as an equalized read sample serving as an output of the adaptive equalizer. The equalized read sample is also led to the subtracter S. The subtracter S computes the difference between the equalized read sample and a reference value and supplies the difference value to the coefficient control circuits $C_0$ to $C_n$ as the error value described above. The reference value supplied to the subtracter S is set to a value for bringing the overall transfer characteristic in the adaptive equalizer and its input system into an ideal or a desired transfer characteristic.

As described above, the adaptive equalizer equalizes the waveform of the read signal to an ideal waveform which ought to be by updating each filter coefficient of the FIR filter at all times.

However, an adaptive equalizer having the structure shown in FIG. 2 has a problem that the circuit scale is increased because the adaptive equalizer requires numbers of coefficient control circuits $C_0$ to $C_n$ and coefficient multipliers $M_0$ to $M_n$ corresponding to the number of the unit delay elements $D_1$ to $D_n$.

OBJECTS AND SUMMARY OF THE INVENTION

The present invention is made to solve the above problem, and its object is to provide an adaptive equalizer of a recorded information reproducing apparatus, having a small circuit scale and making it possible to secure a desired waveform equalizing accuracy.

An adaptive equalizer of a recorded information reproducing apparatus of the present invention, which is provided with a pickup for obtaining a read signal by applying a read beam with a wavelength $\lambda$ to the recording surface of an optical recording medium at a read linear velocity $V_L$ through an objective lens with a numerical aperture NA to receive reflected light converting the reflected light into an electric signal and an A/D converter for obtaining read sample by successively sampling the read signal, comprises first delay means for delaying the above read sample by a predetermined first delay time and successively outputting them, second delay means for further delaying value output from the first delay means by a predetermined second delay time and successively outputting them, third delay means for still further delaying value output from the second delay means by the second delay time and successively outputting them, fourth delay means for still further delaying value output from the third delay means by the first delay time and successively outputting them, skew direction detection means for detecting the direction of the tangential skew occurred between the optical recording medium and the read beam and outputting a skew direction signal showing the detected skew direction, selection means for selecting either a first combination or second combination depending on the skew-direction signal, the first combination comprising the value output from the first delay means and the value output from the fourth delay means, the second combination comprising the read sample and the value output from the third delay means, error operation means for computing the difference between an equalized read sample and a predetermined reference value as an error value, and adaptive operation means for obtaining and outputting the equalized read sample by executing an adaptive operation based on the error value and the values of the combination selected by the selection means; the first delay time and the second delay time respectively satisfying the following inequities:

$\{0.6*(\lambda/NA)/V_L\}$ <first delay time+second delay time< $\{1.0*(\lambda/NA)/V_L\}$ $\{0.3*(\lambda/NA)/V_L\}$ <second delay time< $\{0.6*(\lambda/NA)/V_L\}$

BRIEF DESCRIPTION OF THE DRAWINGS

FIG. 2 is an illustration showing the structure of a conventional adaptive equalizer;

DESCRIPTION OF THE PREFERRED EMBODIMENTS

Figure 3:
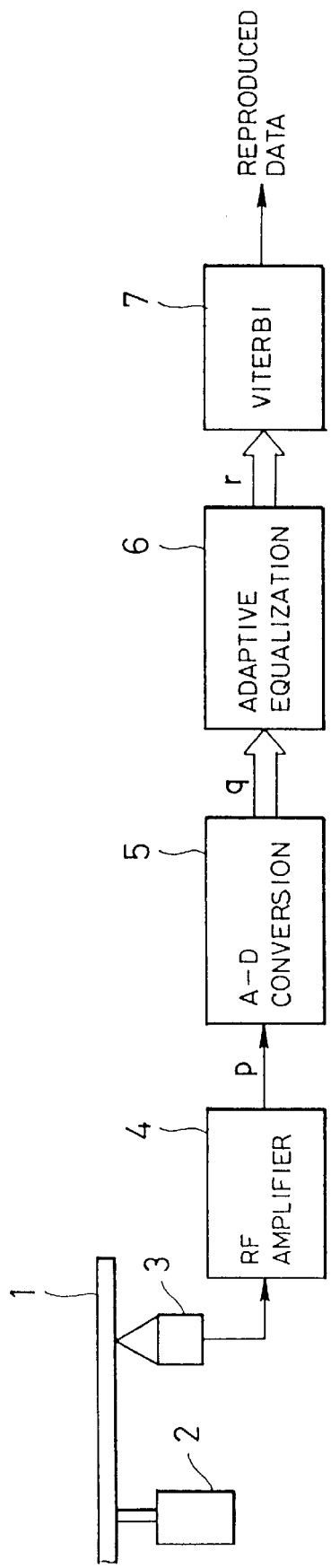
FIG. 3 is an illustration showing the structure of a recorded information reproducing apparatus provided with an adaptive equalizer 6 of the present invention.

FIG. 3 is an illustration showing a schematic structure of a recorded information reproducing apparatus provided with an adaptive equalizer of the present invention.

In FIG. 3, digital data is recorded in a optical disk 1 along a spiral track or concentric tracks. A pickup 3 irradiates a read beam with a wavelength λ from its objective lens toward the optical disk 1. The thus irradiated read beam is reflected by the optical disk 1. The pickup 3 receives the reflected light, converts it into an analog electric signal, and outputs the signal as a read signal. A spindle motor 2 rotates the optical disk 1 so that the read linear velocity by the pickup 3 may become $V_L$. The read signal output as an RF signal from the pickup 3 is amplified by an RF amplifier 4 and then digitized by an A/D converter 5. The A/D converter 5 supplies a read sample q obtained by sampling a read signal p obtained after amplification by the RF amplifier 4 every sampling clock with a frequency fs to the adaptive equalizer 6.

The adaptive equalizer 6 supplies an equalized read sample r obtained by adaptively equalizing the input read sample q in accordance with an adaptive algorithm such as an LMS (least mean square) algorithm to a Viterbi decoder 7. The Viterbi decoder 7 decodes most-probable binary data series based on the equalized read sample r and outputs the binary data series as reproduced data.

Figure 4:
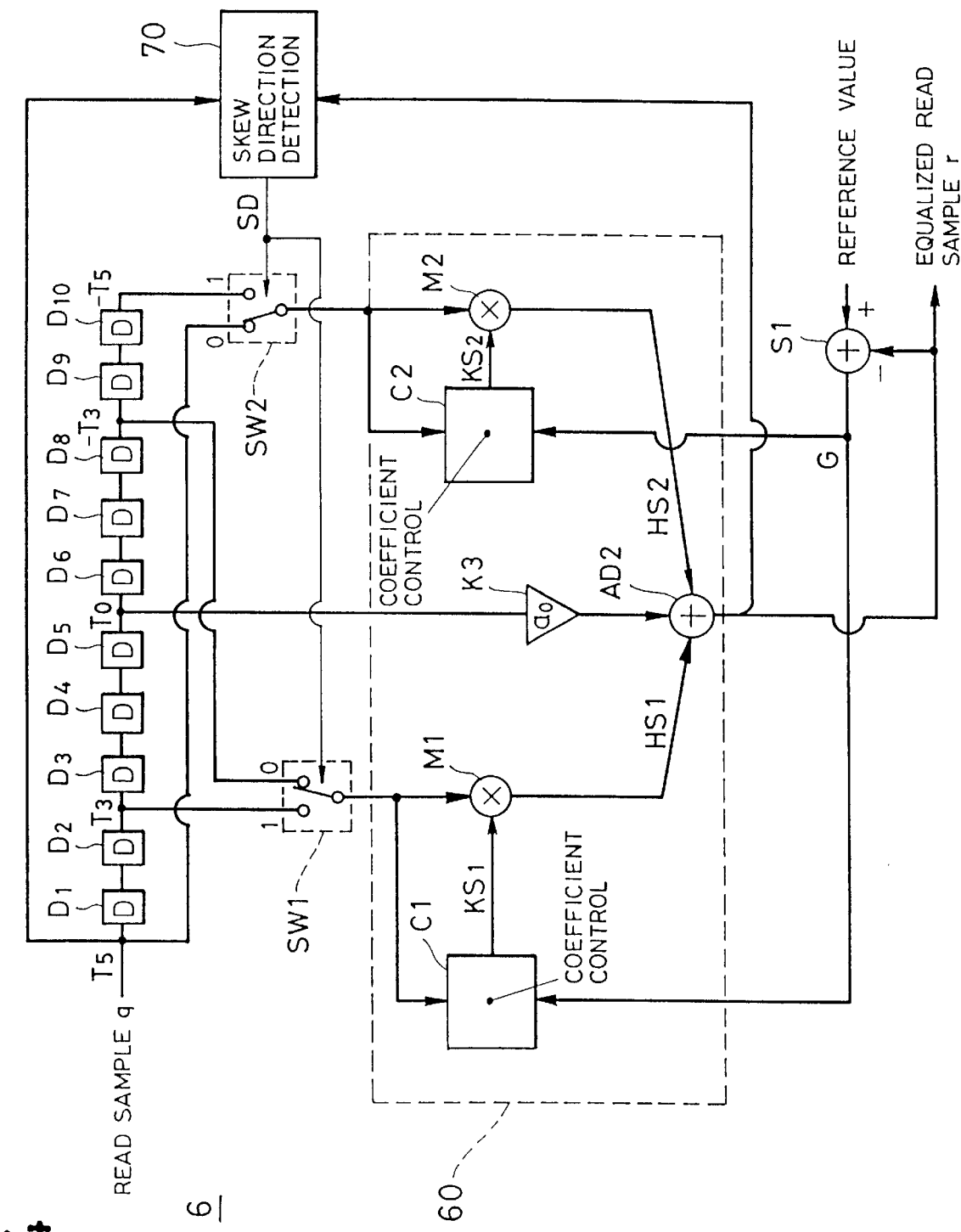
FIG. 4 is an illustration showing an example of the internal structure of the adaptive equalizer 6 of the present invention.

FIG. 4 is an illustration showing an example of the internal structure of the adaptive equalizer 6.

In FIG. 4, the read sample q supplied from the above A/D converter 5 is supplied to a system comprising ten cascade-connected unit delay elements $D_1$ to $D_{10}$ and a skew-direction detection circuit 70 respectively. Each of the unit delay elements $D_1$ to $D_{10}$ provides a time delay equal to the sampling cycle of the A/D converter 5 and the output of one unit delay element serves as an input one sampling period before.

The skew-direction detection circuit 70 detects the direction of a tangential skew based on the read sample q and the equalized read sample r supplied from an adder AD2 and generates a skew-direction signal SD having a logical value corresponding to the skew direction to supply the signal SD to selectors SW1 and SW2 respectively. For example, while the skew-direction detection circuit 70 generates a skew-direction signal SD having a logical value "1" when a positive-directional skew is detected, it generates a skew-direction signal SD having a logical value "0" when a negative-directional skew is detected.

The selector SW1 selects either the output of the unit delay element $D_2$ or the output of the unit delay element $D_8$ depending on the skew-direction signal SD supplied from a skew-direction detection circuit 70 and supplies the selected output to a filter coefficient multiplier M1 and a coefficient control circuit C1 respectively. For example, when the signal logical value of the skew-direction signal SD is "1", the selector SW1 selects the output from the unit delay element $D_2$ and supplies the selected output to the filter coefficient multiplier M1 and coefficient control circuit C1 respectively but selects the output from the unit delay element $D_8$ when the signal logical value of the skew-direction signal SD is "0" supplies the selected output to the filter coefficient multiplier M1 and coefficient control circuit C1 respectively.

The selector SW2 selects either the read sample q or the output of the unit delay element $D_{10}$ depending on the skew-direction signal SD and supplies the selected one to a filter coefficient multiplier M2 and a coefficient control circuit C2 respectively. For example, when the signal logical value of the skew-direction signal SD is "1", the selector SW2 selects the output from the unit delay element $D_{10}$ and supplies the selected output to the filter coefficient multiplier M2 and coefficient control circuit C2 respectively but selects the read sample q when the signal logical value of the skew-direction signal SD is "0" and supplies the read sample q to the filter coefficient multiplier M2 and coefficient control circuit C2 respectively.

That is, when a positive-directional tangential skew is detected, the output value of the unit delay element $D_2$, or the value at a point of time $T_3$ is supplied to the coefficient control circuit C1 and filter coefficient multiplier M1 through the selector SW1, and the output value of the unit delay element $D_{10}$, or the value at a point of time $-T_5$ is supplied to the coefficient control circuit C2 and filter coefficient multiplier M2 through the selector SW2. Meanwhile, when a negative-directional tangential skew is detected, the output value of the unit delay element $D_8$, or the value at a point of time $-T_3$ is supplied to the coefficient control circuit C1 and filter coefficient multiplier M1 through the selector SW1, and the output value of the read sample, or the value at a point of time $T_5$ is supplied to the coefficient control circuit C2 and filter coefficient multiplier M2 through the selector SW2.

The coefficient control circuit C1 multiplies an error value G obtained by a subtracter S1 by a value supplied from the selector SW1 and supplies a value obtained by integrating the multiplication result to the filter coefficient multiplier M1 as a filter coefficient $KS_1$. The filter coefficient multiplier M1 supplies a value obtained by multiplying the value supplied from the selector SW1 by the filter coefficient $KS_1$ to the adder AD2 as a first skew correction value HS1. The coefficient control circuit C2 multiplies the error value G obtained by the subtracter S1 by the value supplied from the selector SW2 and supplies a value obtained by integrating the multiplication result to the filter coefficient multiplier M2 as a filter coefficient $KS_2$. The filter coefficient multiplier M2 supplies a value obtained by multiplying the value supplied from the selector SW2 by the filter coefficient $KS_2$ to the adder AD2 as a second skew correction value HS2. A coefficient multiplier K3 multiplies an output value of the unit delay element $D_5$, or the value at a point of time $T_0$ by a multiplication coefficient $a_0$ (substantially, "1"). The coefficient multiplier K3 supplies the multiplication result to the adder AD2.

The adder AD2 outputs a value obtained by adding the first skew correction value HS1 and the second skew correction value HS2 to the multiplication result of the coefficient multiplier K3 as the equalized read sample r. The adder AD2 supplies the equalized read sample r to the skew-direction detection circuit 70 and the subtracter S1 respectively.

The subtracter S1 computes the difference between the equalized read sample r and a predetermined reference value and supplies the value of the difference to the coefficient control circuits C1 and C2 respectively as the error value G. The reference value supplied to the subtracter S1 is set to a value for bringing the overall characteristic of the adaptive equalizer 6 and its input system into an ideal or desired transfer characteristic.

Next, the operation theory of the adaptive equalizer 6 is described below.

Figure 1A:
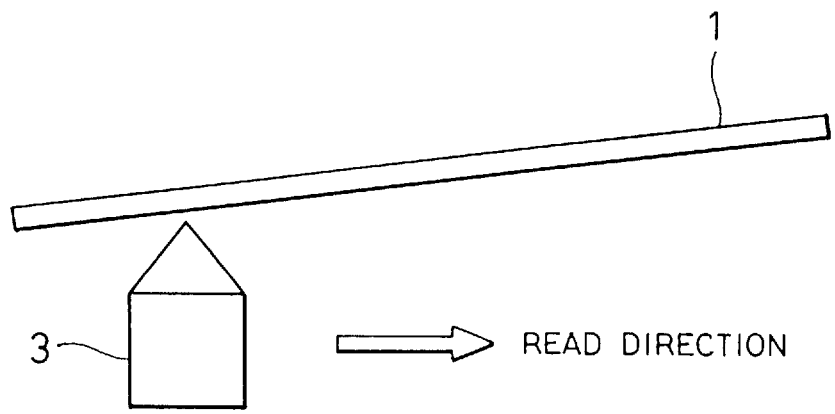
FIGS. 1A and 1B are illustrations showing states of tangential skew.
Figure 1B:
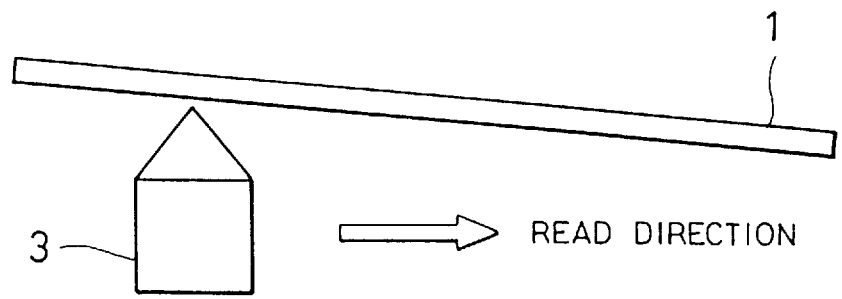
Figure 5A:
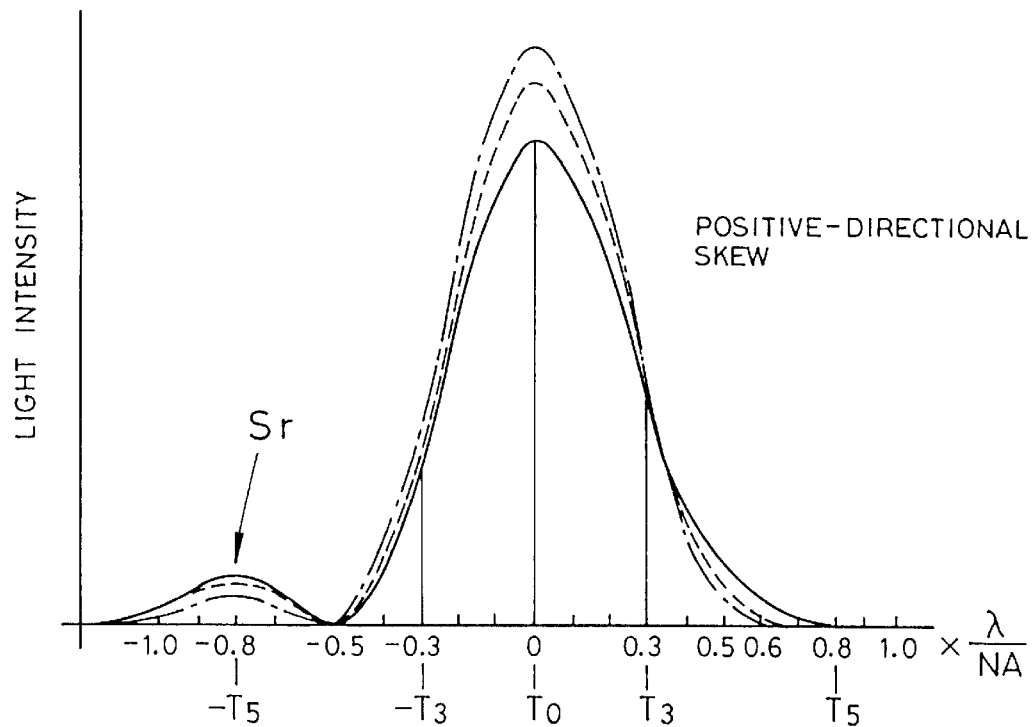
FIGS. 5A and 5B are illustrations each showing a spot profile when a tangential skew is occurring.
Figure 5B:
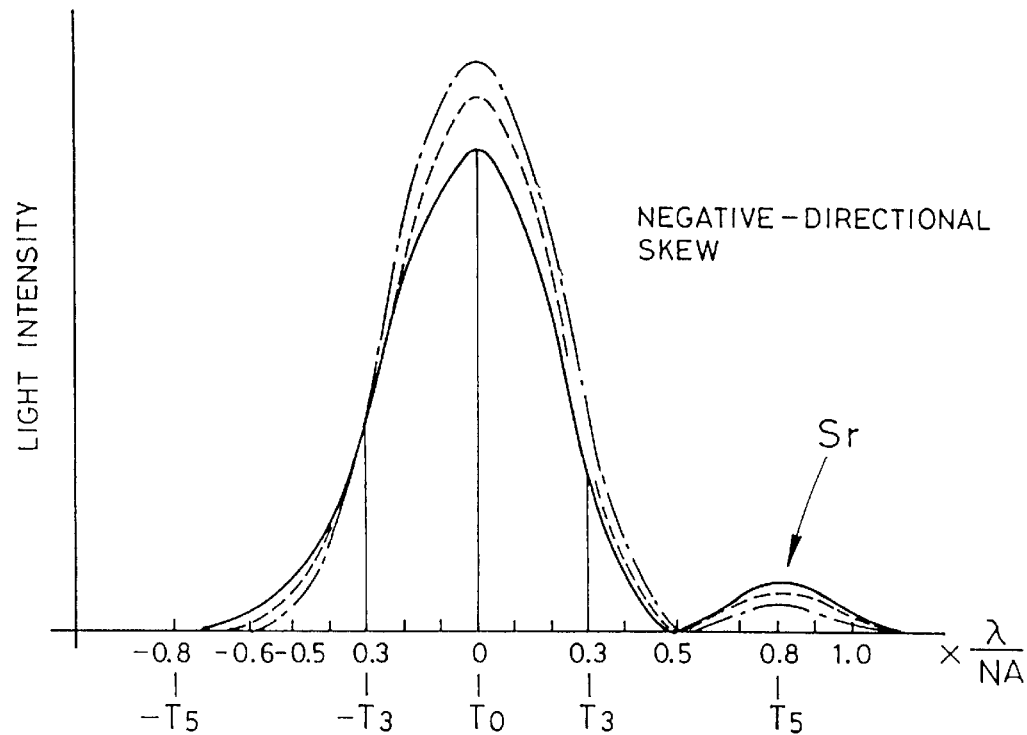

FIG. 5A is an illustration showing the spot profile of a read beam condensed on the recording surface of the optical disk 1 in the tangential direction when a positive-directional tangential skew as shown in FIG. 1A occurs. FIG. 5B is an illustration showing the spot profile of a read beam condensed on the recording surface of the optical disk 1 in the tangential direction when the negative-directional tangential skew shown in FIG. 1B is occurring.

These spot profiles were obtained under the following conditions. NA (numerical aperture) of objective lens of pickup 3=0.55 Wavelength $\lambda$ of read beam of pickup 3=0.635 [mm] Read linear velocity $V_L$/sampling frequency fs=0.17 [mm]

According to the spot profile shown in FIG. 5A, the light intensity on the disk surface spaced from an axis 0 serving as the central axis of the read beam by a distance of $0.3*(\lambda/NA)$ to $0.6*(\lambda/NA)$ in the read direction is larger than the light intensity at a position spaced from the axis 0 by a distance of $-0.3*(\lambda/NA)$ to $-0.6*(\lambda/NA)$. Further, a side lobe Sr which is not observed in the range of $0.6*(\lambda/NA)$ to $1.0*(\lambda/NA)$ is present in the range of $-0.6*(\lambda/NA)$ to $-1.0*(\lambda/NA)$ about a position spaced from the axis 0 by $-0.8*(\lambda/NA)$.

Meanwhile, according to the spot profile shown in FIG. 5B, the light intensity at a position spaced from the axis 0 serving as the central axis of the read beam by a distance of $0.3*(\lambda/NA)$ to $0.6*(\lambda/NA)$ in the read direction is smaller than the light intensity at a position spaced by a distance of $-0.3*(\lambda/NA)$ to $-0.6*(\lambda/NA)$. Further, a side lobe Sr which is not observed in the range of $-0.6*(\lambda/NA)$ to $-1.0*(\lambda/NA)$ is present in the range of $0.6*(\lambda/NA)$ to $1.0*(\lambda/NA)$ about a position spaced from the axis 0 by $0.8*(\lambda/NA)$.

As shown in FIGS. 5A and 5B, even if the value of tangential skew changes by 0.3° (dash-dotted line), 0.6° (broken line), and 0.9° (solid line), a position where symmetry collapses does not change.

As described above, when a tangential skew occurs, a spot profile which should originally be bilaterally symmetric with respect to the axis 0 in FIGS. 5A and 5B becomes asymmetric.

In this case, the above spot profile can be regarded as an impulse response to the information reproducing system (including the optical disk 1, spindle motor 2, and pickup 3) as shown in FIG. 3. When time and read signal level one taken on the x axes and y axes, respectively, in the spot profiles shown in FIGS. 5A and 5B, the turbulence of the impulse response due to the tangential skew appears as increases at the time points $T_3$ and $-T_5$ (for a positive-directional skew) and increases at the time points $-T_3$ and $T_5$ (for a negative-directional skew) by assuming the axis 0 in FIGS. 5A and 5B as a time point $T_0$.

That is, the position of a read signal waveform distorted due to a tangential skew is determined as shown below by the NA of the objective lens of the pickup, the wavelength $\lambda$ of the read beam, and the read linear velocity $V_L$ assuming that the axis 0 due to the impulse response is the time point 0.

$$\{0.6*(\lambda/NA)\} < \text{time point} \pm T_5 < \{1.0*(\lambda/NA)/V_L\}$$

$$\{0.3*(\lambda/NA)\} < \text{time point} \pm T_3 < \{0.6*(\lambda/NA)/V_L\}$$

Therefore, in the case of the adaptive equalizer 6 shown in FIG. 4, a read sample is obtained at the time point $T_3$ with the following first delay time secured by a first delay series of the unit delay elements $D_1$ and $D_2$.

$$\{0.6*(\lambda/NA)/V_L\} < \text{first delay time+second delay time} < \{1.0*(\lambda/NA)/V_L\}$$

Further, a read sample at a time point $T_0$ is obtained with the following second delay time secured by a second delay series of the unit delay elements $D_3$ to $D_5$.

$$\{0.3*(\lambda/NA)/V_L\} < \text{second delay time} < \{0.6*(\lambda/NA)/V_L\}$$

Furthermore, a read sample at the time point $-T_3$ is obtained with the above second delay time secured by a third delay series of the unit delay elements $D_6$ to $D_8$.

Furthermore, a read sample at the time point $-T_5$ is obtained with the above first delay time secured by a fourth delay series of the unit delay elements $D_9$ and $D_{10}$.

In this case, the read sample q supplied from a D/A converter corresponds to the value at the time point $T_5$.

It should be noted here that when a positive-directional tangential skew is occurring, adaptive operation is executed by an adaptive operation section 60 comprising the coefficient control circuits C1 and C2, multipliers M1 and M2, and adder AD2 by selecting read samples at the time points $T_3$ and $-T_5$ by the selectors SW1 and SW2 respectively and using the thus selected read samples. Meanwhile, when a negative-directional tangential skew is occurring, adaptive operation is designed to be executed by selecting read samples at the time points $-T_3$ and $T_5$ by the selectors SW1 and SW2 respectively.

According to the above structure, when the positive-directional tangential skew shown in FIG. 1A is occurring, the first skew correction value HS1 having a negative value corresponding to the increase at the time point $T_3$ in FIG. 5A is obtained, and further, the second skew correction value HS2 having a negative value corresponding to the increase at the time point $-T_5$ in FIG. 5A is obtained. Because these correction values are added to read samples supplied through the delay series of the unit delay elements $D_1$ to $D_5$ by the adder AD2, increases at the time points $-T_5$ and $T_3$ are offset.

When a negative-directional tangential skew as shown in FIG. 1B occurs, the first skew correction value HS1 corresponding to the increase at the point of time $-T_3$ in FIG. 5B is obtained and further, the second skew correction value HS2 corresponding to the increase at the time point $T_5$ in FIG. 5B is obtained. Because these correction values are added to read samples supplied through the delay series of the unit delay elements $D_1$ to $D_5$ by the adder AD2, the increments at the time points $T_5$ and $-T_3$ are offset.

Therefore, according to the above structure, because only point-of-time sample values in which the influence of tangential skew characteristically appears are adapted to be controlled, the distortion of a read signal due to a tangential skew can be compensated by a small circuit structure compared to the structure shown in FIG. 2.

Figure 6:
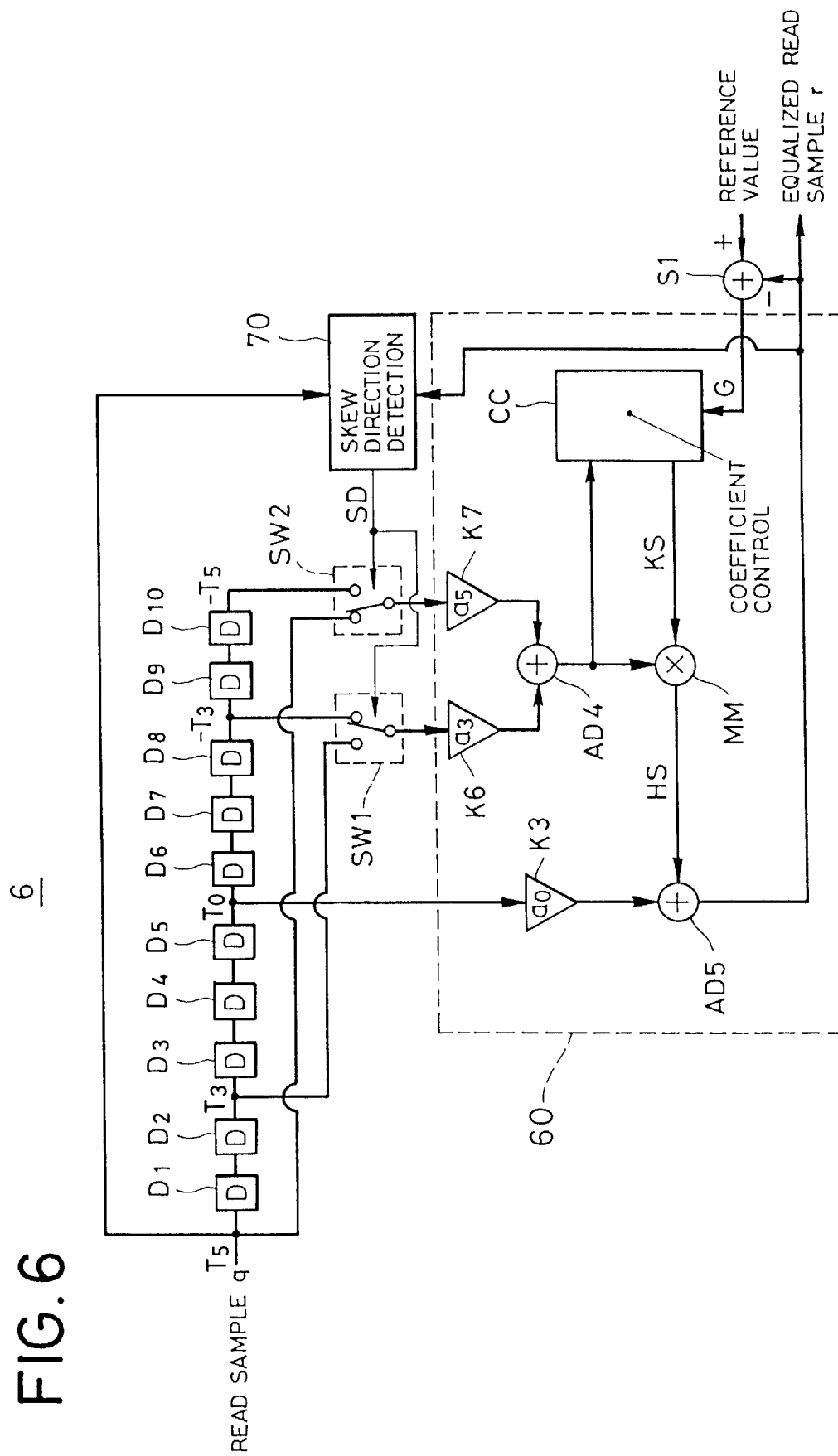
FIG. 6 is an illustration showing another example of the internal structure of the adaptive equalizer 6 of the present invention.

The structure shown in FIG. 4 can be modified to the structure shown in FIG. 6.

The structure in FIG. 6 performs coefficient control after adding point-of-time sample values selected by SW1 and SW2, which is an example where one of two coefficient control means employed in the structure of FIG. 4 is omitted.

In FIG. 6, the read sample q supplied from the A/D converter 5 is supplied to a system comprising ten cascade-connected unit delay elements $D_1$ to $D_{10}$ and the skew-direction detection circuit 70 respectively. The unit delay elements $D_1$ to $D_{10}$ provide time delay equal to the sampling cycle of the A/D converter 5 and the output of one unit delay element serves as an input one sampling period before.

The skew-direction detection circuit 70 detects the direction of tangential skew based on the read sample q and the equalized read sample r supplied from an adder AD5 to be described later, generates a skew-direction signal SD having a logical value corresponding to the skew direction, and supplies the signal SD to the selectors SW1 and SW2 respectively. For example, when a positive-directional skew is detected, the skew-direction detection circuit 70 generates a skew-direction signal SD having a logical value "1" but generates a skew-direction signal SD having a logical value "0" when a negative-directional skew is detected.

The selector SW1 selects either the output of the unit delay element $D_2$ or the output of the unit delay element $D_8$ depending on skew-direction signal SD supplied from a skew-direction detection circuit 70 and supplies the selected output to a coefficient multiplier K6 of an adaptive operation section 60. For example, when the signal logical value of the skew-direction signal SD is "1", the selector SW1 selects the output from the unit delay element $D_2$ and supplies the selected output to the coefficient multiplier K6 but selects the output from the unit delay element $D_8$ when the signal logical value of the skew-direction signal SD is "0" and supplies the selected output to the coefficient multiplier K6.

The selector SW2 selects, depending on the skew-direction signal SD, either the read sample q or the output of the unit delay element $D_{10}$ and supplies the selected one to a coefficient multiplier K7 of the adaptive operation section 60. For example, when the signal logical value of the skew-direction signal SD is "1", the selector SW2 selects the output from the unit delay element $D_{10}$ and supplies it to the coefficient multiplier K7 but selects the read sample q when the signal logical value of the skew-direction signal SD is "0" and supplies it to the coefficient multiplier K7.

The coefficient multipliers K6 and K7 and the adder AD4 weight and add the values supplied from the selectors SW1 and SW2 and supply the obtained values to a coefficient control circuit CC and a filter coefficient multiplier MM respectively.

That is, when a positive-directional tangential skew is detected, a value obtained by weighting and adding a read sample at the time point $T_3$ and a read sample at the time point $-T_5$ is supplied to the coefficient control circuit CC and filter coefficient multiplier MM respectively. The read sample at the time point $T_3$ is the output value of the unit delay element $D_2$. The read sample at the time point $-T_5$ is the output value of the unit delay element $D_{10}$. Meanwhile, when a negative-directional tangential skew is detected, a value obtained by weighting and adding a read sample at the point of time $-T_3$ and a read sample at the point of time $T_5$ is supplied to the coefficient control circuit CC and filter coefficient multiplier MM respectively. The read sample at the point of time $-T_3$ is the output value of the unit delay element $D_8$. The read sample at the point of time $T_5$ is the read sample q supplied from the A/D converter 5.

The coefficient control circuit CC multiplies the error value G obtained by the subtracter S1 by the value obtained through the above weighting and adding. The coefficient control circuit CC supplies a value obtained by integrating the multiplication result to the filter coefficient multiplier MM as a filter coefficient KS. The filter coefficient multiplier MM supplies a value obtained by multiplying the value obtained through the above weighting and adding by the filter coefficient KS to the adder AD5 as a skew correction value HS. A coefficient multiplier K3 multiplies an output value of the unit delay element $D_5$, or the value at a point of time $T_0$ by a multiplication coefficient $a_0$ (substantially, "1"). The coefficient multiplier K3 supplies the multiplication result to the adder AD5.

The adder AD5 outputs a value obtained by adding the skew correction value HS and the multiplication result of the coefficient multiplier K3 as an equalized read sample r. The adder AD5 supplies the equalized read sample r to the skew-direction detection circuit 70 and subtracter S1 respectively.

The subtracter S1 computes the difference between the equalized read sample r and a predetermined reference value and supplies the value of the difference to the coefficient control circuit CC as the above-described error value G. The reference value supplied to the subtracter S1 is set to a value for bringing the overall transfer characteristic of the adaptive equalizer 6 and its input system into an ideal or desired transfer characteristic.

That is, in the structure shown in FIG. 6, the outputs of the selectors SW1 and SW2 are weighted and added by the coefficient multipliers K6 and K7 and the adder AD4, respectively, and only the weighted and added values are subjected to adaptive operation in the adaptive operation section 60.

According to the above structure, two systems of coefficient control circuits and multipliers required in the structure shown in FIG. 4 can be reduced to one system.

Figure 7:
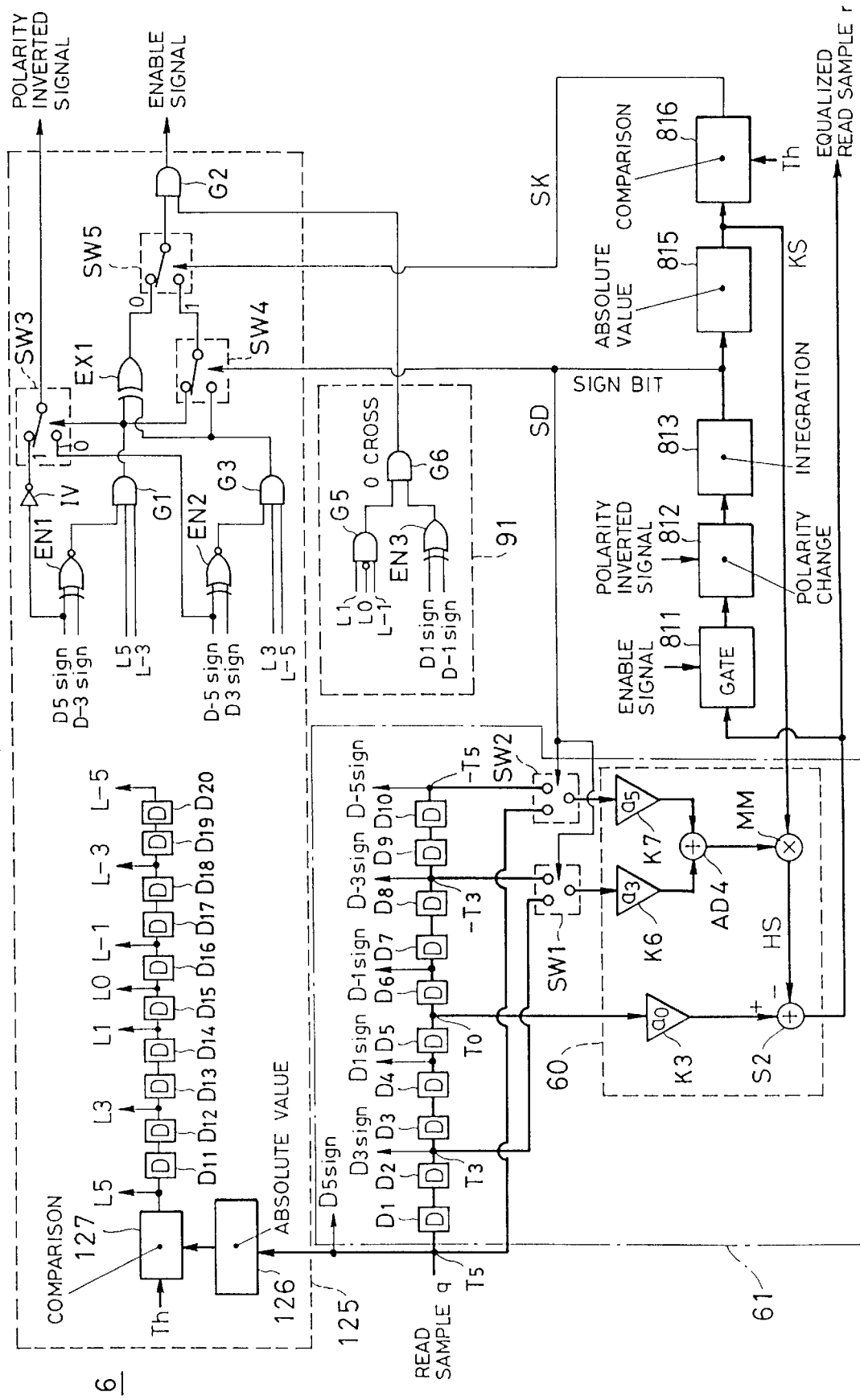
FIG. 7 is an illustration showing an exemplary circuit of the adaptive equalizer 6 according to the structural concept shown in FIG. 6.

FIG. 7 is an illustration showing an example of the structure embodied in accordance with the structural concept of the adaptive equalizer 6 shown in FIG. 6.

In the embodiment shown in FIG. 7, the information reproducing system (including the optical disk 1, spindle motor 2, and pickup 3) shown in FIG. 3 is assumed, for example, to be PR-IV (partial response class IV). In such PR-IV information reproducing system the level of a read signal read from a disk assumes any one of three values "−1", "0", and "+1".

In FIG. 7, the read sample q serving as a discrete signal supplied from the A/D converter 5 in FIG. 3 is supplied to a system comprising ten cascade-connected unit delay elements $D_1$ to $D_{10}$ and a data discrimination circuit 125 respectively. Each of the unit delay elements $D_1$ to $D_{10}$ provides a time delay equal to one sampling cycle of the read sample q.

The selector SW1 selects, depending on the skew-direction signal SD to be described later, the output of the unit delay element $D_2$ or the output of the unit delay element $D_8$. The selector SW1 supplies the selected output to the coefficient multiplier K6 of the adaptive operation section 60. For example, when the signal logical value of the skew-direction signal SD is "1", the selector SW1 selects the output from the unit delay element $D_2$ and supplies it to the coefficient multiplier K6 but selects the output from the unit delay element $D_8$ when the signal logical value of the skew-direction signal SD is "0", and supplies it to the coefficient multiplier K6.

The selector SW2 selects, depending on the skew-direction signal, the read sample q at the time point $T_5$ or the output of the unit delay element $D_{10}$ and supplies the selected one to the coefficient multiplier K7 of the adaptive operation section 60. For example, when the signal logical value of the skew-direction signal SD is "1", the selector SW2 selects the output from the unit delay element $D_{10}$ and supplies it to the coefficient multiplier K7 but selects the read sample q when the signal logical value of the skew-condition signal SD is "0", and supplies it to the coefficient multiplier K7.

The coefficient multipliers K6 and K7 and the adder AD4 supply a value obtained by weighting and adding the values supplied from the selectors SW1 and SW2 to the filter coefficient multiplier MM.

The filter coefficient multiplier MM supplies a value obtained by multiplying the weighted and added value by filter coefficient KS to be described later to a subtracter S2 as a skew correction value HS. A coefficient multiplier K3 multiplies an output value of the unit delay element $D_5$, or the value at a point of time $T_0$ by a multiplication coefficient $a_0$ (substantially, "1"). The coefficient multiplier K3 supplies the multiplication result to a subtracter S2.

The subtracter S2 outputs a value obtained by subtracting the skew correction value HS from an output of the coefficient multiplier K3 as the equalized read sample r and supplies it to a gate circuit 811.

The gate circuit 811 supplies a value output from the subtracter S2 to a polarity change circuit 812 only when an enable signal having a logical value "1" is supplied from a data discrimination circuit 125 to be described later. When a polarity-inverted signal having a logical value "1" is supplied from the data discrimination circuit 125, the polarity change circuit 812 supplies a value obtained by inverting the polarity of a value supplied from the gate circuit 811 to an integration circuit 813, whereas when a polarity-inverted signal having a logical value "0" is supplied from the data discrimination circuit 125, the circuit 812 supplies a value supplied from the gate circuit 811A directly to the integration circuit 813. The integration circuit 813 computes the average of the values supplied from the polarity change circuit 812 and supplies the average value to an absolute value circuit 815. This average value corresponds to the tangential skew. Further, the integration circuit 813 uses the sign bit of the average value as a signal showing the direction of tangential skew and supplies the signal to the data discrimination circuit 125 and the selectors SW1 and SW2 respectively as the above skew-direction signal SD. The absolute value circuit 815 computes the absolute value of the average value supplied from the integration circuit 813 and supplies the absolute value to the filter coefficient multiplier MM and a comparator 816 respectively as the filter coefficient KS. The comparator 816 generates a skew detection signal SK having a logical value "0" when the filter coefficient KS is smaller than a predetermined value Th and supplies the signal SK to the data discrimination circuit 125 but generates a skew detection signal SK having a logical value "1" when the filter coefficient KS is larger than the predetermined value Th and supplies it to the data discrimination circuit 125.

The absolute value circuit 126 and comparator 127 of the data discrimination circuit 125 supply an amplitude data signal having a logical value "1" to the unit delay element $D_{11}$ when the absolute value of each read sample in the read sample q is equal to or larger than the predetermined value Th, that is, the absolute value is not "0" but supply an amplitude data signal having a logical value "0" to the unit delay element $D_{11}$ when the absolute value of the read sample is smaller than the predetermined value Th. That is, the circuit 126 and comparator 127 perform a processing for determining an actual input sample value to any one of two values (0, ±1) which can be taken by the amplitude of the input sample value.

Each of ten cascade-connected unit delay elements $D_{11}$ to $D_{20}$ provides a time delay equal to one sampling cycle of the read sample q. The cascade-connected unit delay element $D_{11}$ receives a one-bit signal successively supplied from the comparator 127. The cascade-connected unit delay elements $D_{11}$–$D_{19}$ successively shift the received one-bit signal to its next delay element.

An EXNOR gate EN1 is provided to decide whether read samples at the time points $T_5$ and $-T_3$ where the influence of a negative-directional tangential skew characteristically appears have the same polarity or different polarities from each other.

The EN1 outputs a logical value "1" when a sign bit $D_{5sign}$ showing the polarity of a read sample at the time point $T_5$ and a sign bit $D_{-3sign}$ (output of the unit delay element $D_8$) showing the polarity of a read sample at the time point $-T_3$ have the same polarity but outputs a logical value "0" when the sign bits have a different polarity from each other.

The output of the EN1 is input to a gate G1. On the other hand, amplitude data signals $L_5$ and $L_{-3}$ at the time points $T_5$ and $-T_3$ are input to the gate G1.

Therefore, the gate G1 outputs a detection signal having a logical value "1" when each of the read sample values at the points of times $T_5$ and $-T_3$ have the same polarity and then each of the amplitude data signals have a logical value "1" but it outputs a detection signal having a logical value "0" in cases other than the above case.

Similarly, in an EXNOR gate EN2 and a gate G3, the sign bits and the amplitude data signals at the time points $-T_5$ and $T_3$ where the influence of a positive-directional tangential skew characteristically appears are determined. The gate G3 outputs a detection signal having a logical value "1" when each of read samples at the time points $-T_5$ and $T_3$ have the same polarity and each of the amplitude data signals at the time points $-T_5$ and $T_3$ have a logical value "1" but outputs a detection signal having a logical value "0" in cases other than the above case. Moreover, the sign bit $D_{5sign}$ at the time point $T_5$ is inverted by an inverter IV and input to a selector SW3. But a sign bit $D_{-5sign}$ at the time point $T_{-5}$ is directly input to the selector SW3. The selector SW3 is selectively controlled by the output of the gate G1. That is, the output of the inverter IV is sent to the polarity change circuit 812 as a polarity change signal when the logical value of the gate G1 is "1" but the sign bit ($D_{-5sign}$) at the time point $T_{-5}$ is output to the polarity change circuit 812 when the logical value of the gate G1 is "0".

The outputs of the gates G1 and G3 are input to an EXOR gate EX1. Therefore, the output having a logical value "1" is generated when either the gate GI or the gate G3 has a "logical value" 1, that is, when read samples at the time points $-T_5$ and $T_3$ where the influence of a positive-directional tangential skew characteristically appears have the same polarity and the amplitude data signals at the time points $-T_5$ and $T_3$ both have a logical value "1", or when read samples at the time points $T_5$ and $-T_3$ where the influence of a negative-directional tangential skew characteristically appears have the same polarity and the amplitude data signals at the time points $T_5$ and $-T_3$ both have a logical value "1".

A selector SW4 is selectively controlled depending on the sign bit (signal SD) of the output of an integration circuit 813, that is, the polarity of a tangential skew. The selector SW4 selects the output of the gate 3 when the tangential skew has a positive polarity but selects the output of the gate G1 when the tangential skew has a negative polarity. Therefore, if the tangential skew has a positive polarity, a signal having a logical value "1" is input to a selector SW5 when read samples at the time points $-T_5$ and $T_3$ have the same polarity and the amplitude data signals at the time points $-T_5$ and $T_3$ both have a logical value "1". However, if the tangential skew has a negative polarity, an output having a logical value "1" is input to the selector SW5 when read samples at the time points $T_5$ and $-T_3$ have the same polarity and the amplitude data signals at the time points $T_5$ and $-T_3$ both have a logical value "1".

The selector SW5 is selectively controlled depending on the output (signal SK) of the comparator 816, that is, on the presence or absence of a tangential skew. The comparator 816 supplies the signal SK having a logical value "1" to the selector SW5 when the signal KS exceeds the reference value Th, that is, when a quantity of positive or negative tangential skew occurs over a predetermined level. However, when the signal KS does not exceed the reference value Th, that is, when no tangential skew is occurring, the comparator 816 supplies the signal SK having a logical value "0" to the selector SW5. The selector SW5 selects an output from the SW4 to supply it to the gate G2 when there is a skew but selects an output from the EX1 to supply it to the gate G2 when there is no skew. Therefore, if a positive-directional skew is occurring, an output having a logical value "1" is output from the selector SW5 when read samples at the time points $-T_5$ and $T_3$ have the same polarity and amplitude data signals at the time points $-T_5$ and $T_3$ both have a logical value "1". However, if a negative-directional skew is produced, an output having a logical value "1" is output from the selector SW5 when read samples at the time points $T_5$ and $-T_3$ have the same polarity and amplitude data signals at the time points $T_5$ and $-T_3$ both have a logical value "1".

Further, if no tangential skew has occurred, an output having a logical value "1" is output from the selector SW5, when read samples at the points of times $-T_5$ ($T_5$) and $T_3$ ($-T_3$) have the same polarity and the amplitude data signals at these points of times both have a logical value "1", so as to detect if any positive- or negative-directional tangential skew is occurring.

A zero-cross detection circuit 91 comprises AND gates G5 and G6 and an EXOR gate EN3. The zero-cross detection circuit 91 generates a zero-cross detection signal having a logical value "1" only when the signal logical values of unit delay elements $D_{14}$ to $D_{16}$ are respectively set to "1", "0", and "1" respectively and the sign bits of values output from the unit delay elements $D_4$ and $D_6$ have values different from one another to supply the zero-cross detection signal to the AND gate G2. That is, the zero-cross detection circuit 91 generates the zero-cross detection signal when detecting that values of every three consecutive read samples are changed from positive values to negative values or negative values to positive values. That is, the zero-cross detection circuit 91 supplies the zero-cross detection signal to the AND gate when the level of an equalizer output signal should zero-cross at the time point $T_0$.

The outputs of the zero-cross circuit 91 and the selector SW5 are both input to the AND gate G2. Therefore, if a positive-directional tangential skew is occurring, an output having a logical value "1" is output from the gate G2 as an enable signal when read samples at the time points $-T_5$ and $T_3$ have the sample polarity, the amplitude data signals at these time points both have a logical value "1", and an equalizer output value at the time point $T_0$ should be 0. However, if a negative-directional tangential skew is occurring, an output having a logical value "1" is output from the gate G2 as an enable signal when read samples at the time points $T_5$ and $-T_3$ have the sample polarity, the amplitude data signals at these time points both have a logical value "1", and the equalizer output value at the time point $T_0$ should be 0. Moreover, if no tangential skew has occurred, an output having a logical value "1" is output from the gate G2 as an enable signal when read samples at the time points $-T_5$ ($T_5$) and $T_3$ ($-T_3$) have the sample polarity, the amplitude data signals at these time points both have a logical value "1", and the equalizer output value at the time point $T_0$ should be 0 in order to detect if positive- or negative-directional tangential skew is occurring.

The actions of the adaptive equalizer 6 can be explained in accordance with the roughly-divided following three modes.

1. When There Is No Tangential Skew

When there is no tangential skew, no error component is present in an equalizer output r. Therefore, an equalizer output value at the zero-cross point of time $T_0$ to be determined by the zero-cross detection circuit 91 becomes 0. Meanwhile, because the comparator 816 outputs an output having a logical value "0", the selector SW5 selects and outputs an output from the EX1. Therefore, an output having a logical value "1" is output from the gate G2 as an enable signal when read samples at the time points $-T_5$ ($T_5$) and $T_3$ ($-T_3$) have the sample polarity, the amplitude data signals at these time points both have a logical value "1", and the equalizer output value at the time point $T_0$ should be 0. In this case, however, no correction signal KS functions because the equalized read sample r is 0.

2. When Producing A Positive- Or Negative-Directional Tangential Skew Is Started To Occur When a tangential skew is started to occur in the positive or negative direction, an error component is produced in the equalized read sample r.

Figure 8:
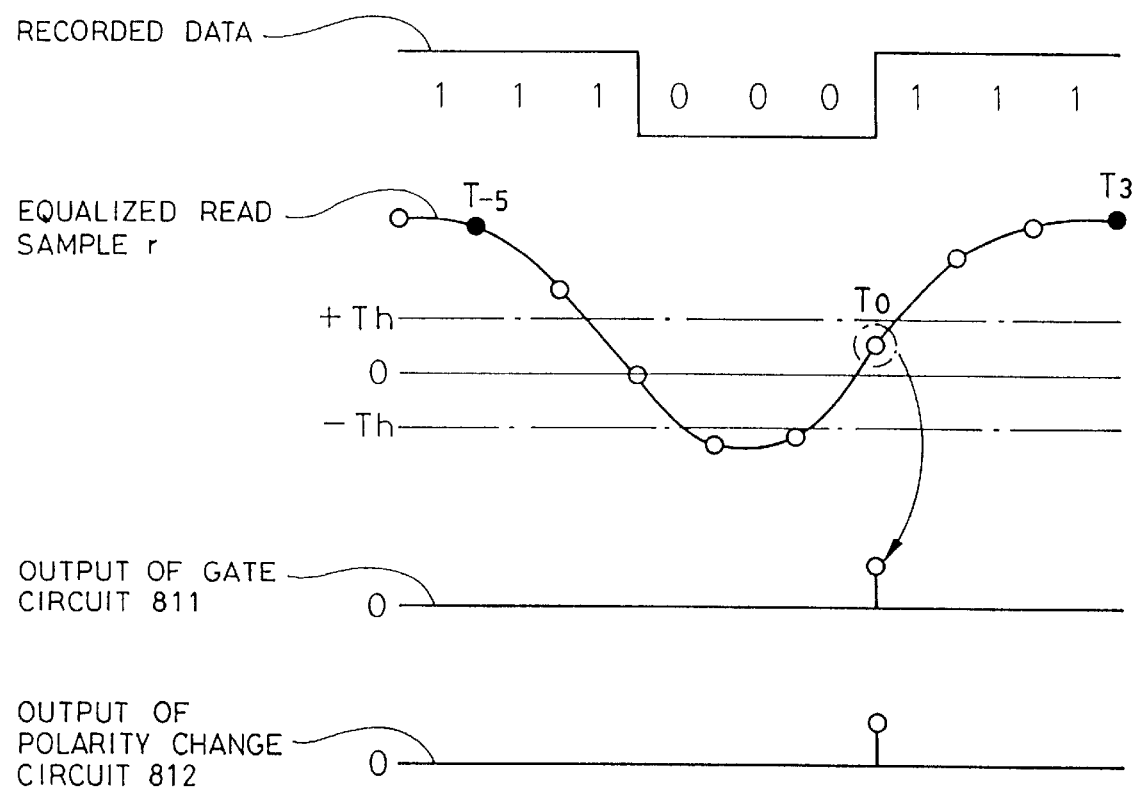
FIG. 8 is an illustration showing an example of the internal operation waveform of the adaptive equalizer 6 when a tangential skew is occurring.

FIG. 8 shows an example of the equalized read sample r generated due to a positive-directional skew.

Thus, it can be found that a positive-directional error value is generated in the equalized read sample r due to recorded data "1" at the time points $-T_5$ and $T_3$ respectively.

Figure 9:
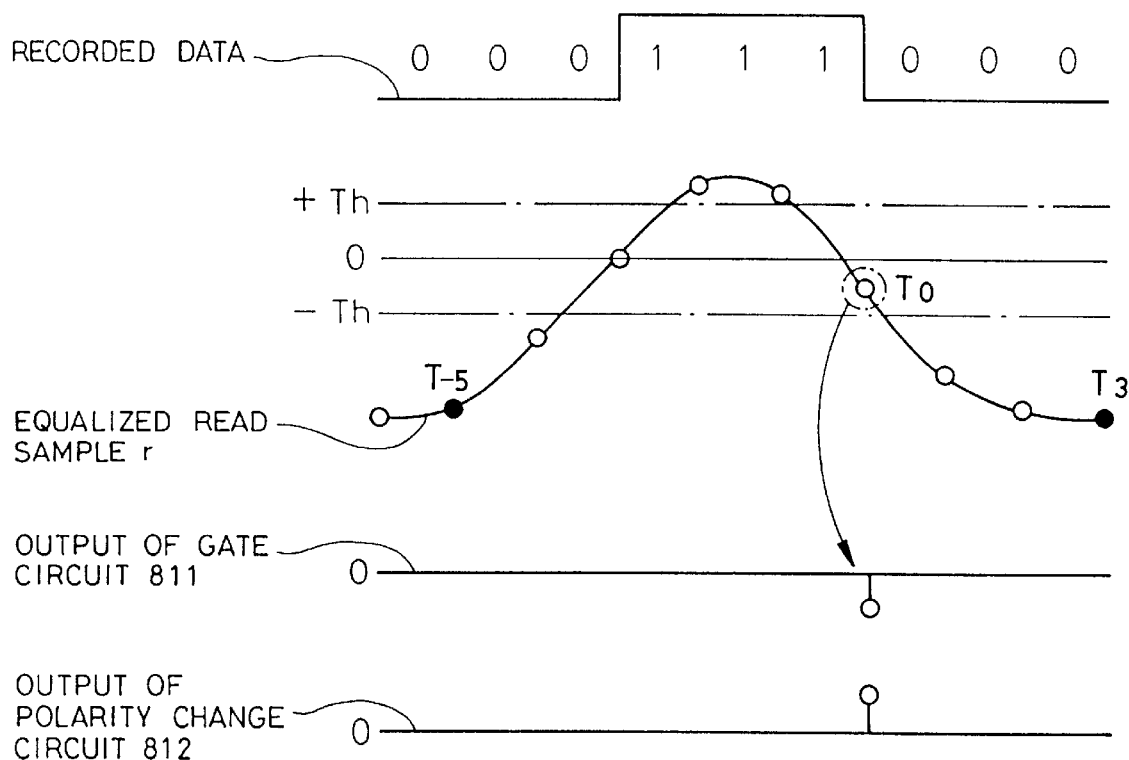
FIG. 9 is an illustration showing another example of the internal operation waveform of the adaptive equalizer 6 when a tangential skew is occurring.

Meanwhile, FIG. 9 shows another example of the equalized read sample r generated due to a positive-directional skew. This shows that a negative-directional error value is produced in the equalized read sample r due to recorded data "0" at the time points $-T_5$ and $T_3$ respectively.

Figure 10:
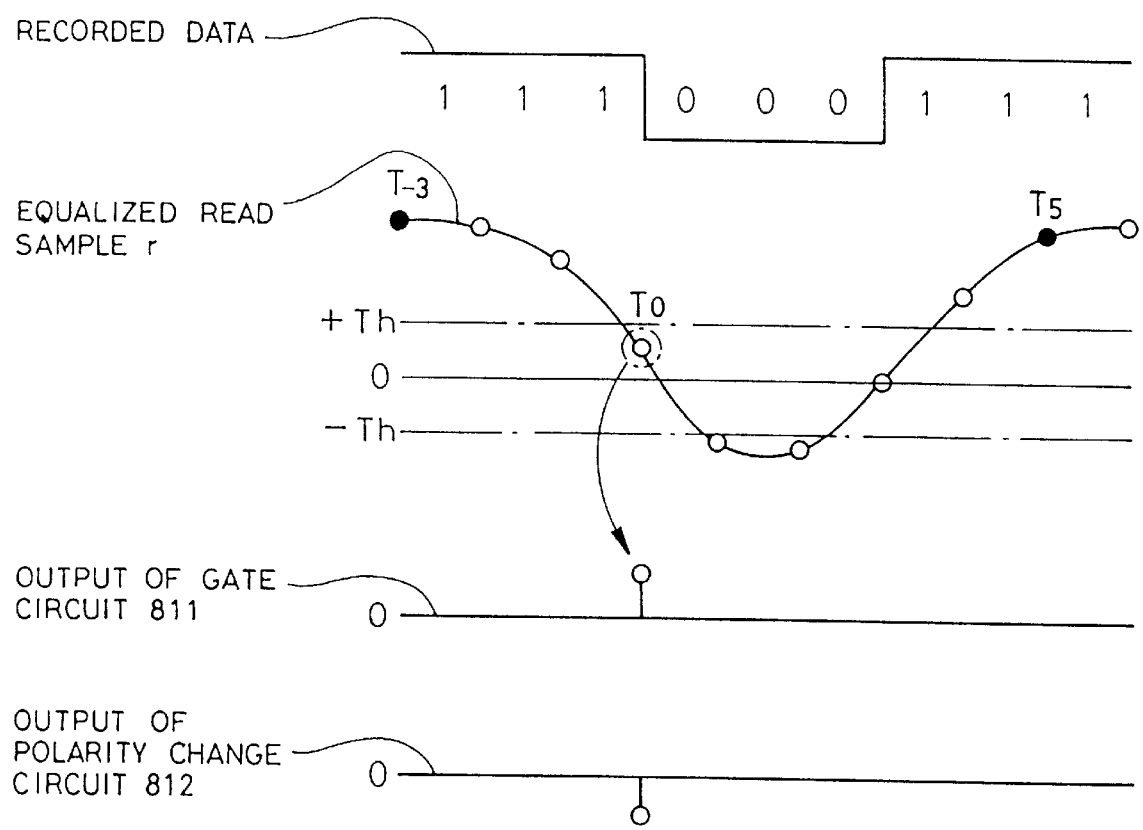
FIG. 10 is an illustration showing another example of the internal operation waveform of the adaptive equalizer 6 when a tangential skew is occurring.

FIG. 10 shows another example of the equalized read sample r generated due to a negative-directional skew. This shows that a positive-directional error value is produced in the equalized read sample r due to recorded data "1" at the time points $T_5$ and $-T_3$ respectively.

Figure 11:
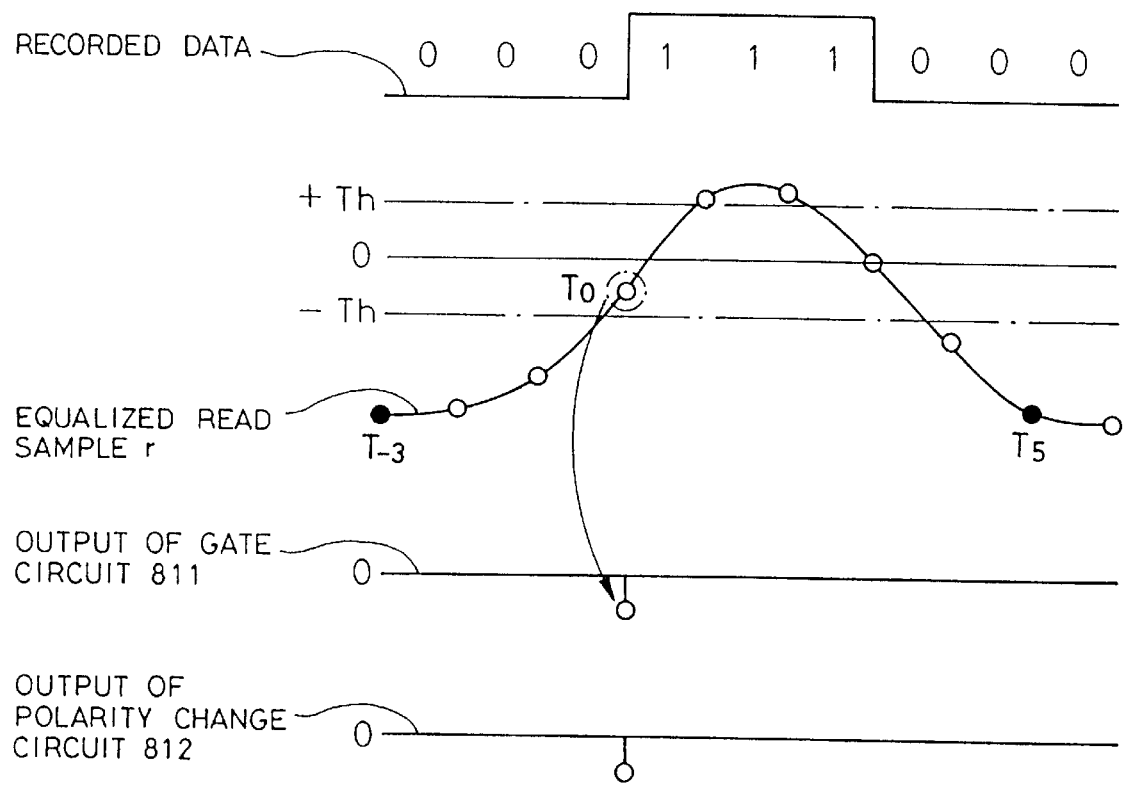
FIG. 11 is an illustration showing another example of the internal operation waveform of the adaptive equalizer 6 when a tangential skew is occurring.

FIG. 11 shows still another example of the equalized read sample r generated due to a negative-directional skew. This shows that a negative-directional error value is produced in the equalized read sample r due to recorded data "0" at the time points $-T_5$ and $T_3$ respectively.

Therefore, for example, when a positive-directional skew is started to occur, a signal showing that read sample values at the time points $-T_5$ and $T_3$ have the same polarity and that amplitude data signals at these time points both have a logical value "1" is output from the gate G3 as a logical value "1". The gate G3 supplies the output signal to the gate circuit 811 through the EX1, selector SW5, and gate G2 as an enable signal. Accordingly, as shown in FIGS. 8 and 9, the error value produced in the equalized read sample r at the point of time $T_0$ is extracted.

On the other hand, because the output of the gate G1 in the above case shows a logical value "0", a signal ($D_{5sign}$) showing a polarity at the time point $-T_5$ is supplied to the polarity change circuit 812 through the selector SW3 as a polarity inverted signal.

It is possible to use a signal $D_{3sign}$ showing a polarity at the time point $T_3$ as the polarity inverted signal.

Therefore, when read sample values at the time points $-T_5$ and $T_3$ are positive, polarities are not changed but a positive error value is directly input to an integration circuit as shown in FIG. 8.

When the read sample values at the time points $-T_5$ and $T_3$ are negative, the polarity is changed and therefore, a positive error value is input to the integration circuit as shown in FIG. 9. In this case, when a positive-directional skew is started to occur, the output of the integration circuit 813 is changed into the positive direction. Moreover, when a negative-directional skew is started to occur, a signal showing that read samples at the time points $T_5$ and $-T_3$ have the same polarity and that the amplitude data signals at these time points both have a logical value "1" is output from the gate G3 as a logical value "1" and supplied to the gate circuit 811 through the EX1, selector SW5, and gate G2 as an enable signal. Thus, as shown in FIGS. 10 and 11, the error value produced in the equalized read sample r at the time point $T_0$ is extracted. On the other hand, because the output of the gate G1 shows a logical value "1", a signal obtained by inverting the signal ($D_{5sign}$) showing a polarity at the time point $T_5$ is supplied to the polarity change circuit 812 through the selector SW3 as a polarity inverted signal. In this case, it is possible to use a signal $D_{-3sign}$ showing a polarity at the time point $-T_3$ as the polarity inverted signal.

Therefore, when read sample values at the time points $T_5$ and $-T_3$ are positive, the polarity is changed and the sample values are input to the integration circuit as negative error values as shown in FIG. 10. However, when read sample values at the time points $T_5$ and $-T_3$ are negative, the polarity is not changed and therefore, the sample values are input to the integration circuit as negative error values as shown in FIG. 11. In this case, when a negative-directional skew is started to occur, the output of the integration circuit 813 is changed into the negative direction.

It is needless to say that the output of the gate G3 can be used as the control signal for controlling the selector SW3.

In this case, the control logic of the selector SW3 should be opposite to the control logic shown in FIG. 7.

3. When Direction Of Tangential Skew Is Determined

Because the output of the integration circuit 813 shows the direction of a tangential skew, the selector SW4 selects the output from the gate G3 to supply it to the selector SW5 when a positive-directional skew is occurring but it selects the output from the gate G1 to supply it to the selector SW5 when a negative-directional skew occurs. When the value of a positive- or negative-directional skew increases, the output of the comparator 816 assumes a logical value "1" and the selector SW5 selects the output from the selector SW4 to supply it to the gate G2.

The selectors SW1 and SW2 are designed to select read sample values at the time points $-T_5$ and $T_3$ when a positive-directional skew is occurring but to select read sample values at the time points $T_5$ and $-T_3$ when a negative-directional skew is occurring.

Therefore, the absolute-value output of the integration circuit 813 is input to one input of the coefficient multiplier MM as the filter coefficient KS and a corresponding read sample value is input to the other input and multiplication is executed. The multiplication output is input to the adder S2 as the correction value HS and correction is performed so as to cancel the error.

Moreover, because enable signals are successively generated through the selector SW4 while a skew is occurring, equalizer outputs at the time point $T_0$ when input sample values are corrected by the control loop are successively generated. This processing is continued until the positive-directional skew is eliminated.

When the positive-directional skew is eliminated, the comparator 816 indicates a logical value "0". Therefore, the selector SW5 is switched so as to select the output from the EX1 and proceeds with the processing in the above Item 2 for deciding in which direction the tangential skew is started to occur, positive or negative direction.

When a negative-directional skew occurred, the actions of the adaptive equalizer 6 are the same as those described above except that the switching operation of the selector SW4 is reversed. Therefore, the detailed description of the actions in such case is omitted.

As described above, in the case of the embodiment shown in FIG. 7, in the PR-IV information reproducing system, the filter coefficient KS is designed to be generated based on the error of an actually obtained read sample for level "0" of three ideal levels "-1", "0", and "+1" because the ideal level of a read signal read from a disk assumes any one of these three values "-1", "0", and "+1".

That is, the fact that the value of a read sample which should originally become "0" contains an error with respect to the value "0" denotes that increases at the time points $-T_5$ and $T_3$ (for a positive-directional skew) or the time points $T_5$ and $-T_3$ (for a negative-directional skew) influence the above fact as shown in FIGS. 5A and 5B. In this case, the filter coefficient KS is generated so that the error may converge to 0 by selectively using read samples at the time points $-T_5$ and $T_3$ or the time points $T_5$ and $-T_3$ depending on the direction of the tangential skew occurring here.

In the constitution of the above embodiment, read samples at the time points $T_3$ and $-T_5$ and read samples at the time points $-T_3$ and $T_5$ are designed to be selected by the selectors SW1 and SW2. However, the present invention is not restricted to the above structure.

Figure 12:
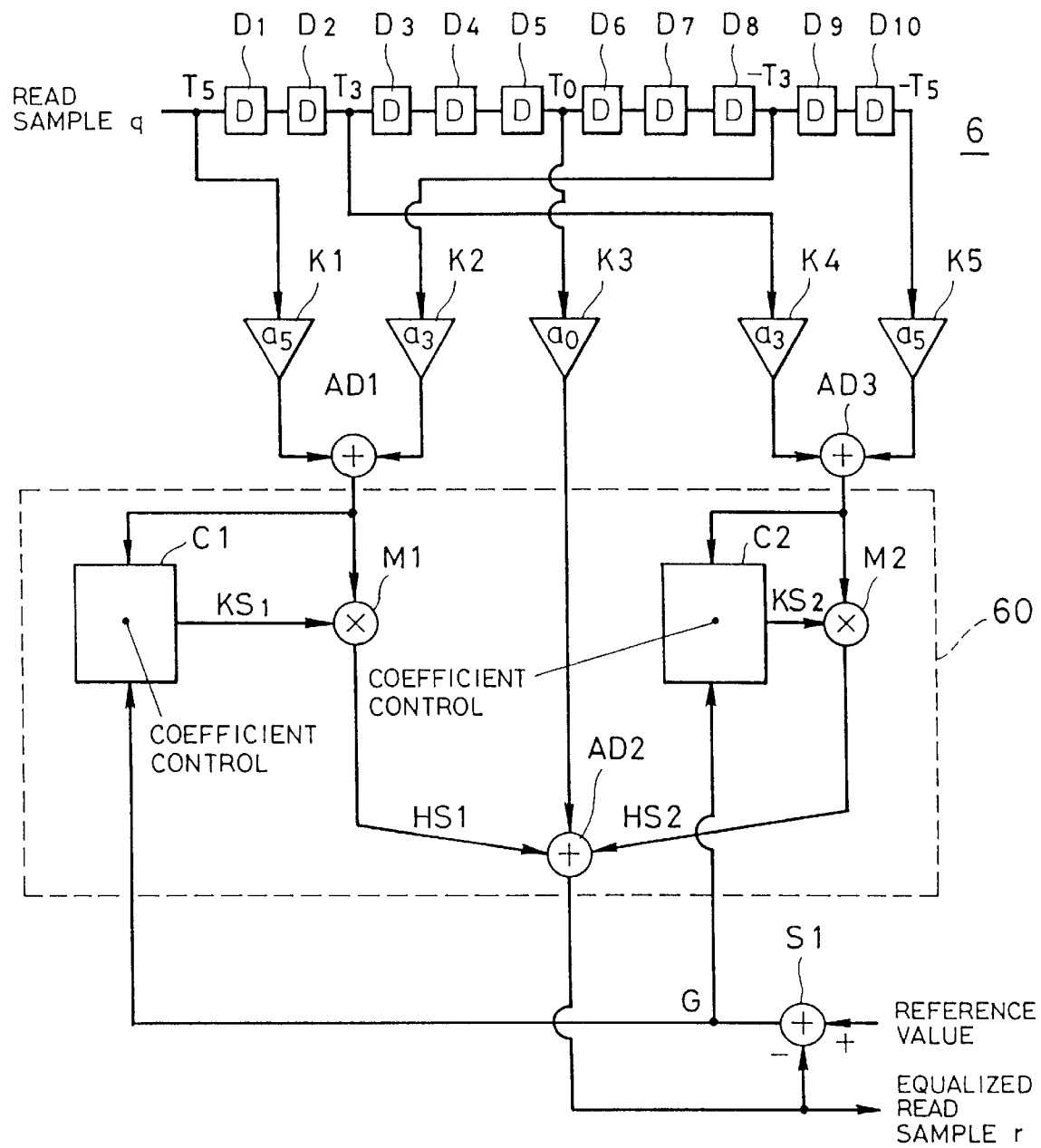
FIG. 12 is an illustration showing another example of the internal structure of the adaptive equalizer 6 of the present invention.

FIG. 12 is an illustration showing an example of another structure of the adaptive equalizer 6 in which the selectors SW1 and SW2 and the skew-direction detector 70 shown in FIG. 6 are omitted.

In FIG. 12, the read sample q supplied from the above A/D converter 5 is supplied to a system comprising ten cascade-connected unit delay elements $D_1$ to $D_{10}$. The unit delay elements $D_1$ to $D_{10}$ provide a time delay equal to the sampling cycle of the A/D converter 5 and the output of one unit delay element serves as an input one sampling period before.

A coefficient multiplier K1 supplies a value obtained by multiplying the read sample q by a multiplication coefficient $a_5$ to the adder AD1. A coefficient multiplier K2 supplies a value obtained by multiplying the output of the unit delay element $D_8$ by a multiplication coefficient $a_3$ to the adder AD1. A coefficient multiplier K3 supplies a value obtained by multiplying the output of the unit delay element $D_5$ by a multiplication coefficient $a_0$ (substantially, "1") to the adder AD2. A coefficient multiplier K4 supplies a value obtained by multiplying the output of the unit delay element $D_2$ by the multiplication coefficient $a_3$ to the adder AD3. A coefficient multiplier K5 supplies a value obtained by multiplying the output of the unit delay element $D_{10}$ by the multiplication coefficient $a_5$ to the adder AD3.

The adder AD1 supplies a value obtained by adding the multiplication result of the coefficient multiplier K1 and the multiplication result of the coefficient multiplier K2 to the coefficient control circuit C1 and filter coefficient multiplier M1 respectively. The adder AD3 supplies a value obtained by adding the multiplication result of the coefficient multiplier K4 and the multiplication result of the coefficient multiplier K5 to the coefficient control circuit C2 and filter coefficient multiplier M2 respectively.

In short, the value of the read sample q and the output of the unit delay element $D_8$ are weighted and added by the structure comprising the adder AD1, coefficient multiplier K1, and coefficient multiplier K2. The weighted and added result is supplied to the adaptive operation section 60. Further, the output of the unit delay element $D_2$ and that of the unit delay element $D_{10}$ are weighted and added by the structure comprising the adder AD3, coefficient multiplier K4 and coefficient multiplier K5. The weighted and added result is supplied to the adaptive operation section 60.

The coefficient control circuit C1 multiplies the error value G obtained by a subtracter S1 by the weighed and added value supplied from the adder AD1. The coefficient control circuit C1 supplies a value obtained by integrating the multiplication result to the filter coefficient multiplier M1 as the filter coefficient $KS_1$. The filter coefficient multiplier M1 supplies a value obtained by multiplying the weighted and added value supplied from the adder AD1 by the filter coefficient $KS_1$ to the adder AD2 as the first skew correction value HS1.

The coefficient control circuit C2 multiplies the error value G obtained by a subtracter S1 by the weighed and added value supplied from the adder AD3. The coefficient control circuit C2 supplies a value obtained by integrating the multiplication result to the filter coefficient multiplier M2 as the filter coefficient $KS_2$. The filter coefficient multiplier M2 supplies a value obtained by multiplying the weighted and added value supplied from the adder AD3 by the filter coefficient $KS_2$ to the adder AD2 as the second skew correction value HS2.

The adder AD2 outputs a value obtained by adding the first skew correction value HS1 and the second skew correction value HS2 to a output of the coefficient multiplier K3 as an equalized read sample r. The equalized read sample r is also led to the subtracter S1.

The subtracter S1 computes the difference between the equalized read sample r and a predetermined reference value and supplies the difference value to the coefficient control circuits C1 and C2 respectively as the above-described error value G. The reference value supplied to the subtracter S1 is set to a value for bringing the overall transfer characteristics of the adaptive equalizer 6 and its input system into an ideal or desired transfer characteristic. Each of the coefficient control circuits C1 and C2 updates the filter coefficients $KS_1$ and $KS_2$ to be supplied to the filter coefficientmultipliers M1 and M2 respectively so that the error value G obtained by the subtracter S1 may be 0.

Figure 13:
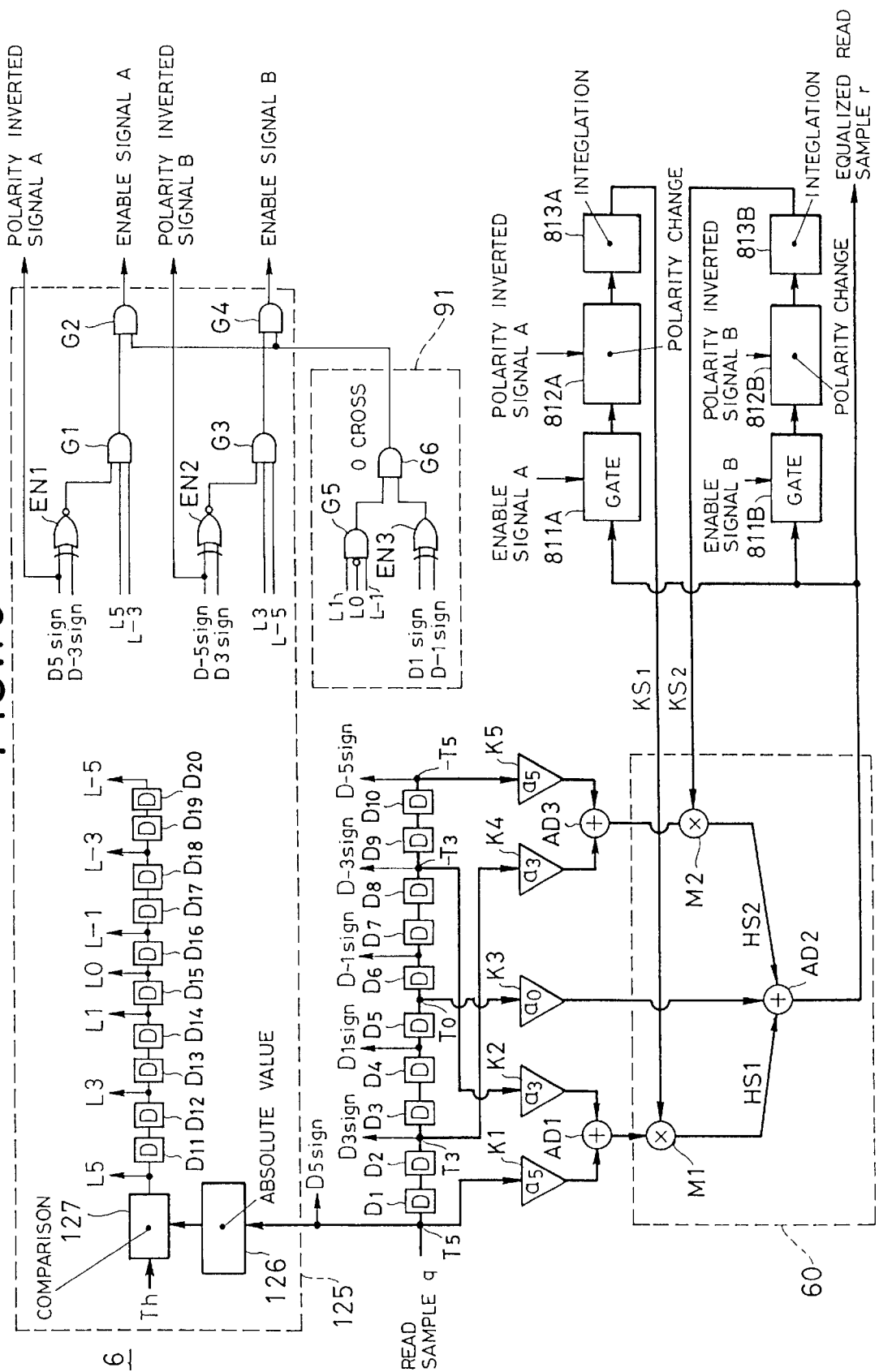
FIG. 13 is an illustration showing an exemplary circuit of the adaptive equalizer 6 according to the structural concept shown in FIG. 12.

FIG. 13 is an illustration showing an example of the structure embodied based on the structural concept of the adaptive equalizer 6 shown in FIG. 12.

In FIG. 13, the read sample q serving as a discrete signal supplied from the A/D converter 5 in FIG. 3 is supplied to a system comprising ten cascade-connected unit delay elements $D_1$ to $D_{10}$ and the data discrimination circuit 125 respectively. Each of the unit delay elements $D_1$ to $D_{10}$ provides a time delay equal to one sampling cycle of the read sample q.

The adder AD1, coefficient multiplier K1 and coefficient multiplier K2 weight and add the value of the read sample r and the output of the unit delay element $D_8$ and supplies the weighted and added result to the multiplier M1. The adder AD3, coefficient multiplier K4, and coefficient multiplier K5 weight and add the output of the unit delay element $D_2$ and that of the unit delay element $D_{10}$ and supplies the weighted and added result to the filter coefficient multiplier M2. The coefficient multiplier K3 supplies a value obtained by multiplying the value of the read sample q supplied through the delay series of the unit delay elements $D_1$ to $D_5$ by the multiplication coefficient $a_0$ to the adder AD2. Incidentally, the multiplication coefficients of the coefficient multipliers K1 to K5 may be all set to "1".

The filter coefficient multiplier M1 supplies a value obtained by multiplying the weighted and added value supplied from the adder AD1 by the filter coefficient $KS_1$ supplied from an integration circuit 813A to the adder AD2 as the first skew correction value HS1. The filter coefficient multiplier M2 supplies a value obtained by multiplying the value supplied from the adder AD3 by the filter coefficient $KS_2$ supplied from an integration circuit 813B to the adder AD2 as the second skew correction value HS2.

The adder AD2 outputs a value obtained by adding the first skew correction value HS1 and the second skew correction value HS2 to a output of the coefficient multiplier K3 as an equalized read sample r. The equalized read sample r is also led to the gate circuits 811A and 811B respectively.

The data discrimination circuit 125 comprises the absolute value circuit 126, comparator 127, unit delay elements $D_{11}$ to $D_{20}$, AND gates G1 to G4, and EXNOR gates EN1 and EN2.

The absolute value circuit 126 and comparator 127 supply a signal having a logical value "1" to the unit delay element $D_{11}$ when the absolute value of each read sample in the read sample q is the predetermined value Th or larger, that is, a value other than "0" but supply a signal having a logical value "0" to the unit delay element $D_{11}$ when the absolute value of the read sample is smaller than the predetermined value Th. Each of ten cascade-connected unit delay elements $D_{11}$ to $D_{20}$, which provides a time delay equal to one sampling cycle of the read sample q. The unit delay elements $D_{11}$ to $D_{20}$ capture one-bit signal successively supplied from the comparator 127 through the unit delay element $D_{11}$ and successively shift the one-bit signal to the unit delay element $D_{20}$.

The circuit comprising the AND gates G1, G2 and EXNOR gate EN1 supplies an enable signal A having a logical value "1" to the gate circuit 811A when the signal $L_5$ output from the comparator 127 and the signal $L_{-3}$ output from the unit delay element $D_{18}$ both have a logical value "1", the sign bit $D_{5sign}$ of each read sample in the read sample q and the sign bit $D_{-3sign}$ of the value output from the unit delay element $D_8$ have the same logical value, and a zero-cross detection signal having a logical value "1" is supplied from a zero-cross detection circuit 91 to be mentioned later.

The circuit comprising the AND gates G3, G4 and EXNOR gate EN2 supplies an enable signal B having a logical value "1" to the gate circuit 811B when the signal $L_3$ output from the unit delay element $D_{12}$ and the signal $L_{-5}$ output from the unit delay element $D_{20}$ both have a logical value "1", the sign bit $D_{3sign}$ of the value output from the unit delay element $D_2$ and the sign bit $D_{-5sign}$ of the value output from the unit delay element $D_{10}$ both have the same logical value, and a zero-cross detection signal having a logical value "1" is supplied from the zero-cross detection circuit 91 to be mentioned later.

The zero-cross detection circuit 91 comprises AND gates G5, G6 and an EXOR gate EN3. The zero-cross detection circuit 91 having the above structure generates a zero-cross detection signal having a logical value "1" when signals $L_1$, $L_0$, and $L_{-1}$ output from the unit delay elements $D_{14}$ to $D_{16}$ have logical values "1", "0", and "1" respectively and sign bits $D_{1sign}$ and $D_{-1sign}$ output from the unit delay elements $D_4$ and $D_6$ have values different from each other and supplies the zero-cross detection signal to the AND gates G2 and G4 respectively.

That is, the zero-cross detection circuit 91 generates a zero-cross detection signal for every three consecutive read samples when it detected that the values of the samples are changed from positive to negative values or negative to positive values.

The gate circuit 811A supplies a value output from the adder AD2 to the polarity change circuit 812A only when the enable signal A having a logical value "1" is supplied from the data discrimination circuit 125. The polarity change circuit 812A supplies a value obtained by inverting the polarity of the value supplied from the gate circuit 811A to the integration circuit 813A when a polarity inverted signal A having a logical value "1" is supplied from the data discrimination circuit 125. The polarity change circuit 812A directly supplies the value supplied from the gate circuit 811A to the integration circuit 813A when a polarity inverted signal A having a logical value "0" is supplied from the data discrimination circuit 125. The integration circuit 813A computes the average of the values supplied from the polarity change circuit 812A and supplies the average value to the filter coefficient multiplier M1 as the above filter coefficient $KS_1$.

The gate circuit 811B supplies a value output from the adder AD2 to the polarity change circuit 812B only when the enable signal B having a logical value "1" is supplied from the data discrimination circuit 125. The polarity change circuit 812B supplies a value obtained by inverting the polarity of the value supplied from the gate circuit 811B to the integration circuit 813B when a polarity inverted signal B having a logical value "1" is supplied from the data discrimination circuit 125. The polarity change circuit 812B directly supplies the value supplied from the gate circuit 811B to the integration circuit 813B when a polarity inverted signal B having a logical value "0" is supplied from the data discrimination circuit 125. The integration circuit 813B computes the average of the values supplied from the polarity change circuit 812B and supplies the average value to the filter coefficient multiplier M2 as the above filter coefficient $KS_2$.

As described above, in the structures shown in FIGS. 12 and 13, values at the time points $-T_3$ and $T_5$ are designed to be weighted and added by the coefficient multipliers K1, K2 and the adder AD1, and values at the time points $T_3$ and $-T_5$ are weighted and added by the coefficient multipliers K4, K5 and the adder AD3, followed by filtering by using these weighted and added values.

For example, when the positive-directional tangential skew as shown in FIG. 1A is occurring, the second skew correction value HS2 having negative values corresponding to the increases at the time points $-T_5$ and $T_3$ in FIG. 5A is obtained. The value HS2 is added by the adder AD2 to the read sample q supplied through the delay series of the unit delay elements $D_1$ to $D_5$. In this case, because increase or decrease with respect to an ideal value is small for the time points $T_5$ and $-T_3$ in FIG. 5A, the first skew correction value HS1 which is approx. 0 is supplied to the adder AD2.

That is, when the positive-directional tangential skew as shown in FIG. 1A is occurring, the adder AD2 offsets the increase at the time points $-T_5$ and $T_3$ by adding the second skew correction value HS2 having a negative value to the read sample q supplied through the delay series of the unit delay elements $D_1$ to $D_5$.

Meanwhile, when the negative-directional tangential skew as shown in FIG. 1B is occurring, the first skew correction value HS1 having a negative value corresponding to the increases at the time points $T_5$ and $-T_3$ in FIG. 5B is obtained. The value HS1 is added to the read sample q supplied through the delay series of the unit delay elements $D_1$ to $D_5$. In this case, because an increase or decrease with respect to an ideal value is small for the time points $-T_5$ and $T_3$ in FIG. 5B, the second skew correction value HS2 which is approx. 0 is supplied to the adder AD2.

That is, when the negative-directional tangential skew as shown in FIG. 1B is occurring, the adder AD2 offsets the increases at the time points $T_5$ and $-T_3$ by adding the first skew correction value HS1 having a negative value to the read sample q supplied through the delay series of the unit delay elements $D_1$ to $D_5$.

Further, it is possible to dispose the FIR filter section 61 in FIG. 7 upstream the skew detection section and correction coefficient computation section instead of disposing it in these sections.

Figure 14:
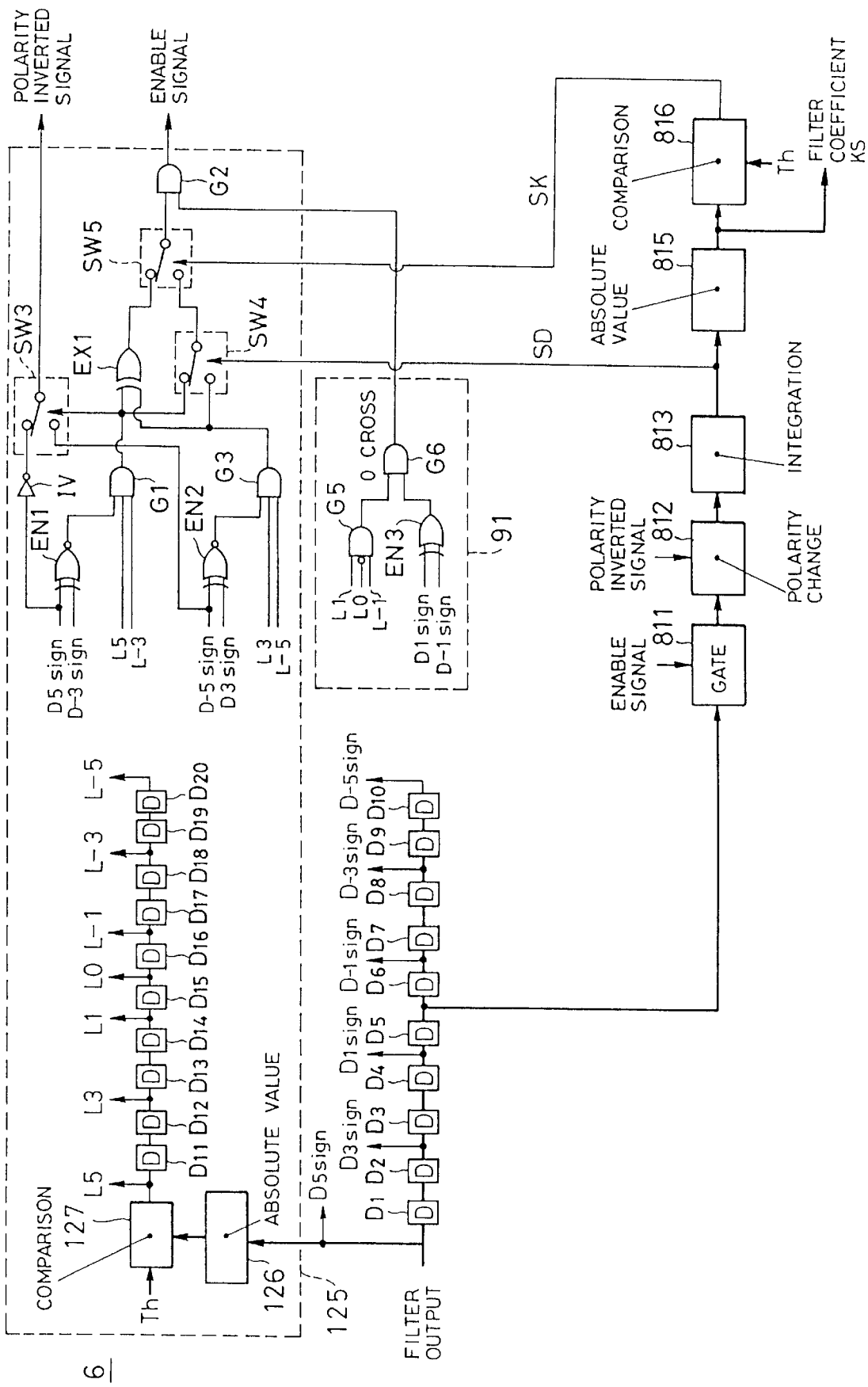
FIG. 14 is an illustration showing the structure of a coefficient control section according to another structure of the adaptive equalizer 6 of the present invention.

FIG. 14 shows the above embodiment in which the skew detection section and the filter coefficient computation section are disposed downstream the output of the FIR filter 61 (not illustrated).

The embodiment shown in FIG. 14 further requires the unit delay elements $D_1$ to $D_{10}$ compared to the embodiment shown in FIG. 7. However, because each of circuits are arranged downstream the FIR filter, the time delay necessary for operations performed in the FIR filter can be ignored. Therefore, an enable signal can be easily synchronized with an error signal input to the gate 811, advantageously. Incidentally, since basic actions of this embodiment are the same as those of the embodiment shown in FIG. 7, their detailed description is omitted.

The above structure makes it possible to provide an adaptive equalizer having a desired waveform-equalizing capacity with a small circuit scale.

The present invention is described above referring to the preferred embodiments. It should be understood that those skilled in the art can realize various modifications and variations and that all such modifications and variations are included in the appended claims.

What is claimed is:

1. An adaptive equalizer of a recorded information reproducing apparatus provided with a pickup for receiving reflected light when a read beam having a wavelength $\lambda$ is applied to the recording surface of an optical recording medium through an objective lens having a numerical aperture NA at a read linear velocity $V_L$ and converting the reflected light into electric signal to obtain read signal and an A/D converter for successively sampling said read signal to obtain read sample, the equalizer comprising:

first delay means for delaying said read sample by a predetermined first delay time and successively outputting said read sample;

second delay means for further delaying the value output from said first delay means by a predetermined second delay time and successively outputting the resulting value;

third delay means for further delaying the value output from said second delay means by said second delay time and successively outputting the resulting value;

fourth delay means for further delaying the value output from said third delay means by said first delay time and successively outputting the resulting value;

skew-direction detection means for detecting the direction of a tangential skew occurring between said optical recording medium and said read beam and outputting a skew-direction signal showing the detected skew direction;

selection means for selecting either a first combination or second combination depending on said skew-direction signal, said first combination comprising the value output from said first delay means and the value output from said fourth delay means, said second combination comprising said read sample and the value output from said third delay means;

error operation means for computing the difference between an equalized read sample and a predetermined reference value as an error value; and adaptive operation means for computing said equalized read sample by executing adaptive operations based on said error value and the value of the combination selected by said selection means and outputting said equalized read sample;

wherein said first delay time and said second delay time satisfy the following inequalities respectively:

$\{0.6*(\lambda/NA)/V_L\}$ < said first delay time + said second delay time < $\{1.0*(\lambda/NA)/V_L\}$ $\{0.3*(\lambda/NA)/V_L\}$ < said second delay time < $\{0.6*(\lambda/NA)/V_L\}$.

2. The adaptive equalizer according to claim 1, wherein said adaptive operation means includes:

coefficient control means for generating a filter coefficient based on a value obtained by multiplying the value of the combination selected by said selection means by said error value, multiplication means for multiplying the values of the combination selected by said selection means by said filter coefficient to provide a skew correction value, and addition means for outputting a value obtained by adding the values output from said second delay means and said skew correction value as said equalized read sample.

3. The adaptive equalizer according to claim 1, wherein said adaptive operation means and said error operation means include:

gate means for extracting the values of said equalized read sample obtained at the point of time closest to the zero cross point when said equalized read sample shifts from a positive value to a negative value or vice versa as said error value, polarity change means for changing the polarity of said error value depending on the polarity of the combination selected by said selected means and outputting the thus changed value, absolute value means for computing the absolute value of a value output from said polarity change means as a filter coefficient, multiplication means for multiplying the value of the combination selected by said selection means by said filter coefficient to provide a skew correction value, and addition means for outputting a value obtained by adding the values output from said second delay means and said skew correction value as said equalized read samples;

said skew-direction detection means using the polarity of the value output from said polarity change means as said skew-direction signal.

4. An adaptive equalizer of a recorded information reproducing apparatus provided with a pickup for receiving reflected light when a read beam having a wavelength $\lambda$ is applied to the recording surface of an optical recording medium through an objective lens having a numerical aperture NA at a read linear velocity $V_L$ and converting the reflected light into electric signal to obtain read signal and an A/D converter for successively sampling said read signal to obtain read sample, the equalizer comprising:

first delay means for delaying said read sample by a predetermined first delay time and successively outputting the resulting value;

second delay means for further delaying the value output from said first delay means by a predetermined second delay time and successively outputting the resulting value;

third delay means for further delaying the value output from said second delay means by said second delay time and successively outputting the resulting value;

fourth delay means for further delaying the value output from said third delay means by said first delay time and successively outputting the resulting value;

first weighting and addition means for weighting and adding said read sample and the value output from said third delay means;

second weighting and addition means for weighting and adding the value output from said first delay means and the value output from said fourth delay means;

error operation means for computing the difference between an equalized read sample and a predetermined reference value as an error value; and adaptive operation means for computing said equalized read sample by executing adaptive operations based on the weighted and added values obtained by said first and second weighting and addition means and said error value;

wherein said first delay time and said second delay time satisfy the following inequalities respectively:

$\{0.6*(\lambda/NA)/V_L\}$ < said first delay time + said second delay time < $\{1.0*(\lambda/NA)/V_L\}$ $\{0.3*(\lambda/NA)/V_L\}$ < said second delay time < $\{0.6*(\lambda/NA)/V_L\}$.

5. The adaptive equalizer according to claim 4, wherein said adaptive operation means includes:

first coefficient control means for generating a first filter coefficient based on the value obtained by multiplying the weighted and added value obtained by said first weighting and addition means by said error value, second coefficient control means for generating a second filter coefficient based on the value obtained by multiplying the weighted and added value obtained by the second weighting and addition means by said error value, first multiplication means for multiplying the weighted and added value obtained by said first weighting and addition means by said first filter coefficient to provide a first skew correction value, second multiplication means for multiplying the weighted and added value obtained by said second weighting and addition means by said second filter coefficient to provide a second skew correction value, and addition means for outputting a value obtained by adding said first and second skew correction values to the value output from said second delay means as said equalized read sample.

6. The adaptive equalizer according to claim 1 or 4, wherein said error operation means uses the value of said equalized read sample obtained at a point of time closest to the zero cross point when said equalized read sample shifts from a positive value to a negative value or vice versa as said error value.

\* \* \* \* \*